(12) United States Patent  (10) Patent No.: US 9,075,499 B2
Chakrabarty et al.  (45) Date of Patent: Jul. 7, 2015

(54) METHOD AND APPARATUS FOR PROVIDING REFERENCE CONTENT

(75) Inventors: Madhavi M. Chakrabarty, Kendall Park, NJ (US); Fraser G. Bowie, Bernardsville, NJ (US); Nathaniel C. Thomas, Montclair, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 63 days.

(21) Appl. No.: 13/594,160

(22) Filed: Aug. 24, 2012

(65) Prior Publication Data

US 2014/0058840 A1  Feb. 27, 2014

(51) Int. Cl.
*G06F 17/30* (2006.01)
*G06F 3/0481* (2013.01)
*G06Q 30/00* (2012.01)
*G06Q 30/02* (2012.01)

(52) U.S. Cl.
CPC ........ *G06F 3/0481* (2013.01); *G06F 17/30864* (2013.01); *G06Q 30/01* (2013.01); *G06Q 30/0281* (2013.01)

(58) Field of Classification Search
CPC ................................................ G06F 17/30864
USPC .................................................. 707/750, 957
See application file for complete search history.

(56) References Cited

U.S. PATENT DOCUMENTS

| | | | | |
|---|---|---|---|---|
| 5,845,263 A * | 12/1998 | Camaisa et al. | ................. | 705/15 |
| 6,016,146 A * | 1/2000 | Beer et al. | ..................... | 715/825 |
| 6,052,121 A * | 4/2000 | Webster et al. | ................ | 715/733 |
| 8,001,567 B2 * | 8/2011 | Ozer et al. | ........................ | 725/44 |
| 2002/0122063 A1 * | 9/2002 | Weinberg et al. | ............. | 345/764 |
| 2003/0154120 A1 * | 8/2003 | Freishtat et al. | ................... | 705/9 |
| 2004/0203639 A1 * | 10/2004 | Ozer et al. | ................. | 455/414.1 |
| 2007/0022020 A1 * | 1/2007 | Bernstein | ........................ | 705/26 |
| 2008/0244430 A1 * | 10/2008 | Shortell et al. | ................ | 715/764 |
| 2009/0187939 A1 * | 7/2009 | Lajoie | .............................. | 725/34 |
| 2009/0282369 A1 * | 11/2009 | Jones | ............................. | 715/848 |
| 2010/0146380 A1 * | 6/2010 | Rousso et al. | ................. | 715/234 |
| 2010/0159967 A1 * | 6/2010 | Pounds et al. | ................. | 455/466 |
| 2010/0293479 A1 * | 11/2010 | Rousso et al. | ................. | 715/760 |
| 2010/0333136 A1 * | 12/2010 | Lau et al. | ........................ | 725/39 |
| 2012/0084663 A1 * | 4/2012 | Momchilov et al. | .......... | 715/744 |
| 2012/0109777 A1 * | 5/2012 | Lipsitz et al. | ................ | 705/26.5 |
| 2012/0124624 A1 * | 5/2012 | Lau et al. | ......................... | 725/39 |
| 2012/0158551 A1 * | 6/2012 | Gonsalves et al. | ............ | 705/27.2 |
| 2012/0173977 A1 * | 7/2012 | Walker et al. | ................. | 715/716 |
| 2012/0254804 A1 * | 10/2012 | Sheha et al. | .................. | 715/834 |
| 2013/0080948 A1 * | 3/2013 | Wright et al. | ................. | 715/764 |
| 2013/0106830 A1 * | 5/2013 | De Loera et al. | ............. | 345/419 |
| 2013/0227422 A1 * | 8/2013 | Lehmann et al. | ............. | 715/738 |

* cited by examiner

*Primary Examiner* — Jean B Fleurantin
*Assistant Examiner* — Nargis Sultana

(57) ABSTRACT

An interactive grid display presented on a communications device offers a frontline representative of an enterprise or other user at a work site access to information for addressing a client's request. Available information is sorted and selected via the interactive grid based on a number of primary categories that are identified along one dimension of the grid and a number of subcategories identified along another dimension of the grid. Information is presented in the interactive grid directly, for example, typically without requiring the user to conduct a search for the information. In response to a user selecting a point on the grid for the category and sub-category that best matches the information desired by the representative, based on grid intersection for appropriate primary and secondary categories, the device interface drills down to obtain more specific information for presentation to the user.

20 Claims, 30 Drawing Sheets

Interface 131

Interface 131

Interface 131

Interface 131

Interface 131

FIG. 8C

Interface 131

Interface 131

Interface 131

FIG. 14

METHOD AND APPARATUS FOR PROVIDING REFERENCE CONTENT

BACKGROUND

Frontline representatives of companies are often faced with questions to which they may not have immediate answers. In such situations, a frontline representative may consult a content repository that includes answers to the question at hand. For example, assuming that a frontline representative, working at a storefront or call center of a wireless communications provider, is faced with questions regarding terms and conditions of a wireless communications plan or features and options provided by a wireless handset, the representative would need to conduct a search and consult a content repository that includes the information regarding the wireless plan or the wireless handset before he/she can provide his/her client with appropriate answers. Often, in order to conduct the search, the frontline representative would need to leave the sales floor (and the client), go behind a counter, and use a desktop personal computer (PC) to conduct a search for the information requested by client.

In recent years, application software programming schemes have been used to develop interfaces that may be used by frontline representatives in obtaining information regarding sales, inventory catalogues, customer support, client request, etc. In spite of the recent advances, accessing the requested information is still difficult and often requires leaving the sales floor and conducting an extensive search of the available databases.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 6 to 15 depict various screens that may be presented as a user navigates through the frontline representative assistance application interface.

DETAILED DESCRIPTION

Figure 1:
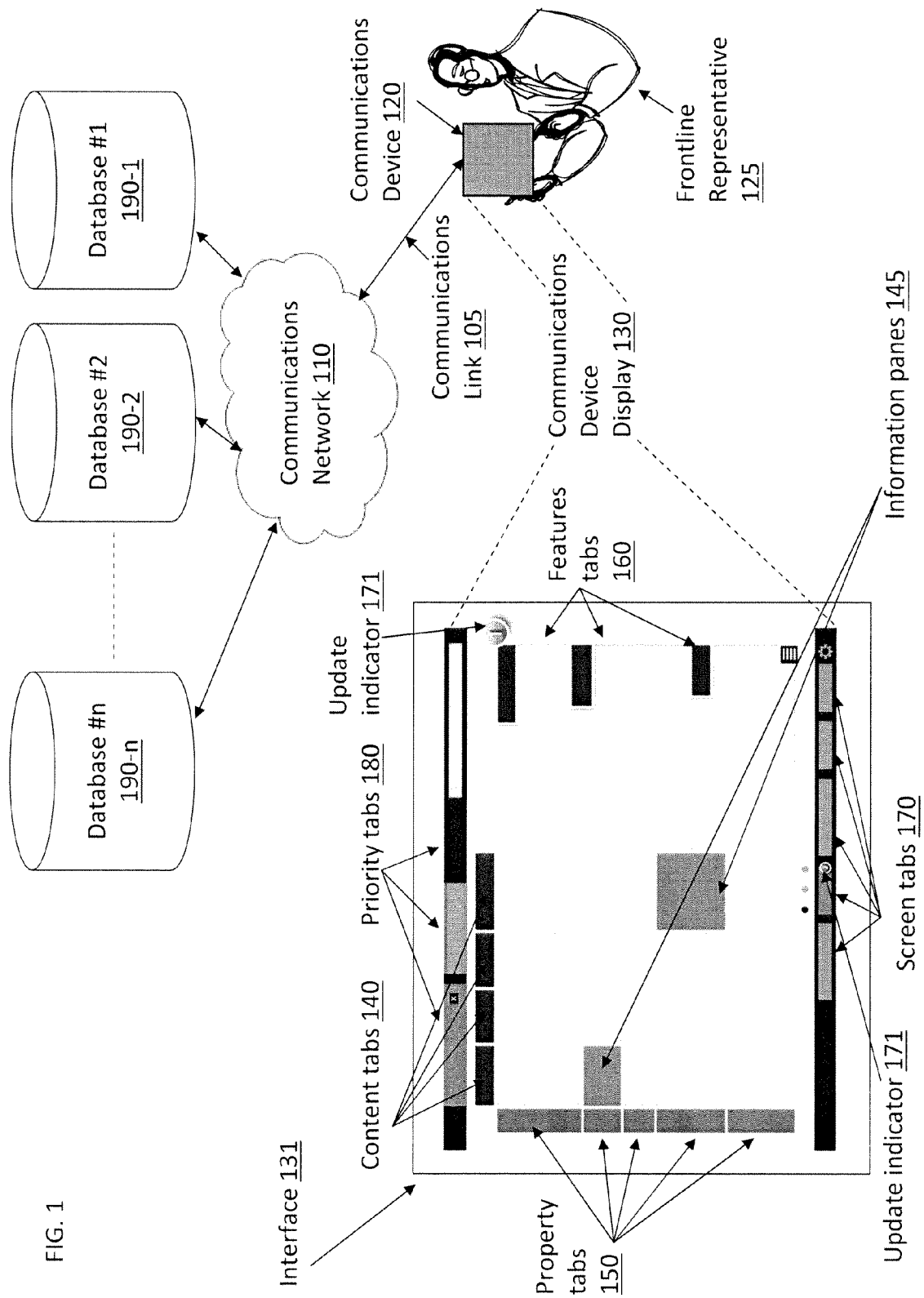
FIG. 1 is an example block diagram of a system for providing reference content.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

In order to overcome difficulties of current frontline representative assistance applications software, methods and corresponding computer implemented methods and systems described herein provide simplified information for use in responding to clients' requests. In one example, frontline representatives or other persons use an interface provided on the display of a communications device to access reference content and operations information for responding to requests from individuals who do business or may do business with the enterprise (generally referred to herein simply as "clients"). The user interface includes an interactive grid display that such access to information for addressing a client's request. Some information is presented in the panes at the intersections of the grid, and the interface allows navigation to more detailed related information in response to selection of a pane from the grid. In the examples, however, access to most if not all of the assistance information is directly available in that the user need not open a menu or the like and need not utilize a search function and review search results, although some pages may offer a search as an additional further option. In the examples shown in the drawings and described in detail below, the most accessed information is available to the user via the panes, without having to tap/click in any panes of the grid. Additional information or more detailed information is available when the user navigates by tapping/clicking/searching. In this way, the exemplary interface design accounts for the most likely accessed information to be available on the grid so that the user has to take no action to access them. Further information is available in a quick and effective manner with relatively minimalist further user input, e.g. by simply selecting a grid pane and/or selecting a further link from a subsequently accessed page.

FIG. 1 depicts an example of a system for providing reference content to a frontline representative of an enterprise, such as a sales or service representative in a store or the like. The system includes communications device 120 that may be used to present an interface 131 of a frontline representative assistance application (not separately shown in this drawing) for providing assistance to a frontline representative 125 of the enterprise. The frontline representative assistance application software enables the communications device 120 to provide the frontline representative assistance interface 131 via the input/output elements of the particular type of communications device 120. The drawing, shown in FIG. 1, illustrates an example of a graphical user interface (GUI) implementation of the frontline representative assistance interface 131, as may be shown to a frontline representative 125 via the display 130 of the communications device 120. In a later discussed example, at least a substantial portion of the relevant assistance application software runs on a processor of the communications device 120; although the application software need not to be hosted or executed on the communications device 120 and may be hosted remotely from the communications device 120.

The assistance application provides information to the representative 125 to assist in the representative's activities at the enterprise work site. For example, the application provides easy access to information that has or is expected to be frequently requested by one or more representatives at the work site, to address issues of interest or concern to clients. Assistance information is information for a representative or other user that is intended or expected to address a client inquiry, e.g. to help in answering a question or correcting or otherwise addressing an issue of concern to a client of the enterprise. Using manual or automated techniques, the enterprise can organize the assistance information, in a database or other repository, in a manner configured to readily address frequent client requests (e.g. based on experience with client requests) and/or based on expected frequent client requests (e.g. expectations created by upcoming product or service roll-outs). In this way, the assistance information is essentially a knowledge base useful for addressing common issues that the enterprise may face in its interactions with its clients. The assistance application software facilitates an easy and effective access to the assistance information in the knowledge base. As discussed more later, the exemplary interface also provides further information or tools to the representative to help in performance of their duties on behalf of the enterprise.

In the examples, the assistance content that shows in the grid is ranked relative to request frequency (e.g. actual or expected). The ranking process, for example, may be an automated process based on system logs (that measure how often the content was accessed in the past week and/or past month) as well as when the content was last updated. However, if there is a new roll-out by the organization, there will be no information in the system log for the related content(s); but the assistance content regarding the roll-out may still be ranked higher than other content in terms of possible request frequency because the content related to the roll-out supports an important business initiative. To help improve the rank of certain pieces of assistance content, there may be a provision for the system administrator to manually rank a piece of content to be very high.

The communications device 120 may be any mobile (e.g., wireless) or non-mobile (e.g., desktop) communications device 120 that includes the required capabilities for launching and displaying the interface 131, receiving requests from the frontline representative 125, and providing the frontline representative 125 with appropriate information in response to each request (e.g., by displaying the information or providing an audio representation of the information).

In one example, the communications device 120 may be stationary and permanently mounted at a location in a work site (not shown) at which the frontline representative is serving clients of an enterprise. Alternatively, in another example, the communications device 120 may be a mobile/wireless communications device. Examples of the mobile/wireless communications device 120 include, but are not limited to, mobile phones, mobile tablets, Personal Digital Assistants (PDAs), laptop or netbook computers, portable digital video recorders, etc.

As noted, the communications device 120 includes a display 130 for displaying images and interfaces of various application programs, including the frontline representative assistance application interface 131. The display 130 may be a built-in display. Further, the display 130 may be a touch screen display that detects the presence of pressure and location of a touch within the display area. The touch screen responds to being touched with various objects, such as fingers, hands, or a stylus.

The communications device 120 may be coupled with one or more peripheral devices (not shown) that facilitate employee interaction with the computing device. The peripheral devices may be built-in units. Examples of the peripheral devices include, but are not limited to, a mouse, a keypad, and/or a printer.

The communications device 120 may include one or more audio I/O devices (e.g., microphone, speaker, etc.). Further, the communications device 120 may include video capabilities. The communications device 120 may also include a camera (not shown) or a scanner (not shown) for obtaining input including barcodes, quick response codes, pictures, or videos.

The communications device 120, in one example, may be a device that is dedicated to assisting the frontline representative in obtaining the information used in conducting client transactions and answering clients' requests. In such examples, the communications device 120 may be enabled to run limited software (such as that for frontline representative assistance, etc. . . . ).

The frontline representative 125 gains network connectivity through a communications network 110 that is linked to the communications device 120 via a communications link 105. By connecting to the communications network 110, using his/her communications device 120, the frontline representative 125 gains access to various communications features, such as voice calls, video calls, data access, searching, web browsing, text messaging, etc.

The communications network 110 may be a high-bandwidth and/or band-limited communications network. Further, the communications network 110 may be a wireless communications network. In some examples, the communications network 110 may be a local area network (LAN), metropolitan area network (MAN), or a wide-area network (WAN), such as the Internet. The network 110 may include one or more segments of one or more general purpose network (e.g., Internet, LAN, etc.) and/or other networks (e.g., Internet protocol (IP) network). Depending on the type of communications device 120 used (e.g., mobile or a network device), the communications device 120 gains network connectivity through appropriate communications links 105 (e.g., wireless and/or wired communications links) and appropriate communication networks 110. In a storefront or the like, where the communications device 120 is portable, a typical arrangement may provide WiFi connectivity within the work site. The communications device 120 communicates via WiFi wireless link with a wireless access point router in or about the premises of the work site; and the router provides connectivity to a wired local area network, or to a wider area intranet or the Internet serving as or connected to network 110. In such an implementation, a mobile tablet implementation of the device 120 may be particularly advantageous, for example, due to size/font and portability so that the representative has the answers at his/her fingertips when a customer asks.

As noted, the frontline representative assistance application interface 131 provides the frontline representative 125 with information to assist in handling client requests, in many cases, without requiring the frontline representative 125 to search for the information. For example, the representative 125 can navigate through information available through the interface 131 without necessarily having to formulate a search query and review a list of search results, although some pages offered via the interface 131 may include a search option among the navigation choices. The interface 131 includes at least a main page (e.g. homepage) that is provided as a multi-dimensional grid, having a number of fields of the grid (i.e., information panes 145) within which some information is presented to the representative, before requiring any specific selection from the homepage by the representative. In examples shown later, some information can be provided directly in the panes 145; and, in response to a pane 145 being activated (e.g., by a mouse click or by being touched), the interface 131 provides the frontline representative 125 with information for use in addressing clients' requests. The information available to the front line representative is dynamically generated and may be pre-populated based on various criteria as user location type (e.g. retail store or call center), role (e.g. sales or support), and/or the enquirer's geographical location. For example, the dynamically generated information presented via the interface 131 may reflect that a customer in State A may be eligible for discounts and services not available in State B.

In one example, before accessing the multi-dimensional grid of the interface 131, the software application is configured so that the communications device 120 displays a prompt to the frontline representative 125 (via the interface 131), prompting the representative for an input to select a category regarding which he/she wishes to obtain information. For example, assuming that the frontline representative 125 works at a storefront or call center of a wireless communications provider, the frontline representative 125 may be asked to select from among a number of wireless communications devices regarding which he/she wishes to obtain information (e.g., device 1, device 2, device 3, etc.). In some examples, the frontline representative 125 is given the option to skip this feature and directly proceed to launching the multi-dimensional grid of frontline representative assistance application interface 131 without making a selection.

If a selection is made, the multi-dimensional grid of the frontline representative assistance application interface 131 is launched along with a priority tab 180 that indicates that the multi-dimensional grid has been launched in response to selection made by the frontline representative 125. For example, assuming that the frontline representative 125 selects a device referenced as "device 1" when prompted for selecting a device for obtaining information, a priority tab 180 having the term "device 1" may be presented to indicate that the information in the multi-dimensional grid corresponds to the device referenced as "device 1." In one example, additional priority tabs 180 are used to indicate, for example, other interfaces launched for other categories in which the frontline representative 125 may be interested.

Regardless of whether or not a category is selected, the frontline representative assistance application interface 131 appears as a multi-dimensional grid having a first number of fields on one side (e.g., content tabs 140, positioned horizontally in the interface 131 shown in FIG. 1). The content tabs 140 represent a number of primary categories that are available to be searched by the frontline representative 125 using the device 120. These primary categories can differ among different work sites depending on type of services and/or products of the enterprise offered at each work site and are selected by enterprise authorities operating or overseeing each work site based on their knowledge of the products and services offered at the work site.

The information organized under the content tabs 140 may vary depending on the content appearing on the priority tab 180 for the multi-dimensional grid of the frontline representative assistance application interface 131. For example, assuming that the frontline representative represents a storefront or call center of a wireless service provider, the primary categories included in the content tabs 140 categories such as account, billing, wireless devices, activation requirements, wireless plans, features, promotions, etc.

The multi-dimensional grid further includes a number of secondary sub-categories (e.g., property tabs 150, positioned vertically in the interface 131 shown in FIG. 1) that represent sub-categories corresponding to the topics covered in each of the primary content tabs 140. The property tabs 150 include a number of sub-topics for the main categories represented by content tabs 140. For example, referring to a wireless service provider storefront or call center example presented above, the property tabs 150 may include topics such as description, specification, operation instructions, policy, troubleshooting, or pricing.

The sections in the multi-dimensional grid, sometimes referred to herein as information panes 145, provide the frontline representative 125 with at least some initial information to possibly address clients' requests without having to conduct a search. If not sufficient to enable a representative 125 to answer a client inquiry, information in a pane 145 typically informs the representative 125 about further more detailed information that is available from the assistance information database/content repository if the representative selects the particular pane at an intersection of a row and column. For example, assuming that the frontline representative 125 needs to address a certain client request, the frontline representative 125 selects a content tab 140 corresponding to a main category to which the representative believes the client request is related based on the labels of the content tabs 140 as well as a property tab 150 corresponding to a secondary category to which the representative believes the request is related based on the labels of the property tabs 150 and finds the information pane 145 corresponding to the selected content tab 140 and the selected property tab 150. The information included in the information pane 145 may be used to address the clients' request, or the representative can drill down to obtain further relevant information by operating the device 120 to select the particular pane 145 from the grid. For example, referring to the wireless service provider example presented above, assuming that the frontline representative 125 needs to determine how to troubleshoot a mobile device, the frontline representative 125 selects the information pane 145 that falls under the content tab 140 labeled "Device" and the property tab 150 labeled "troubleshooting." In a more specific illustration shown and described later (re navigation to the view of FIG. 9C), the relevant pane 145 may show an excerpt of text handling various common problems with the currently selected device. If one or more of the options visible in the pane 145 seem relevant to the particular client's request, the representative can navigate to the next page with the more detailed information on those options by operating the device 120 to select the particular pane 145 from the grid, thus obtaining the required information by further navigations upon selecting the information pane 145 corresponding to the selected content tab 140 and the property tab 150. The only selection that the frontline representative had to make was the mobile device in priority tabs 180.

The multi-dimensional grid may further include a number of fields that represent additional topics regarding which the frontline representative 125 may be interested in obtaining information (e.g., features tabs 160, positioned vertically in the frontline representative assistance application interface 131 shown in FIG. 1). For example, categories such as promotions, deals, etc. may be included in the features tabs 160. Alternatively or additionally, the features tabs 160 may include subcategories of the property tabs 150. In such examples, the feature tabs 160 provide a third and thus an additional level of information to the topics presented by the property tabs 150. In an example discussed more later, when a user selects (e.g. taps or clicks on) the Feature, Promotion or Plans tab 160, the communication device 120 causes the assistance interface 131 to provide a listing of all active content under the selected tab heading.

The frontline representative assistance application interface 131 further includes a number of screen tabs 170 that enable the frontline representative 125 to launch other software or applications for use in serving the clients or tending to the matters pending at the work site. For example, the screen tabs 170 may provide the frontline representative 125 with access to system properties, alert screens, etc.

The frontline representative assistance application interface 131 may further indicate to the frontline representative 125 that updates to the information included in the multidimensional grid have become available. For example, as shown in FIG. 1, an update indicator 171 may be used to indicate that new features (e.g., new promotions) have become available. The frontline representative assistance application interface 131 may further indicate to the frontline representative 125 that updates to other tabs and screens have become available. For example, as shown in FIG. 1, the frontline representative assistance application interface 131 may indicate to the frontline representative 125 that updates to screen tabs 170 have become available.

For example, when any new content is created by the content authors, the content is flagged as new in the assistance content repository. As another example, when an existing piece of content is updated significantly, it is flagged by the content authors as new in the content repository. When the representative next uses the assistance system, the content that has been flagged as new by the authors shows up as new to the user via the appropriate update indicator 171. Once the user reads the content, the flag of that piece of content is reset for the user; and the respective update indicator 171 no longer appears on the interface 131. The flag can also be reset after a period of time, say 30 days. In this way, for the user, anytime she or he goes to the system, an appropriate update indicator 171 informs the user of any content that is flagged as "new" by the content authors and thus appears as new to the user. Once the user goes to the content page, the "new" flag is removed and the update indicator 171 no longer is displayed. Also, if the user has not been in the system for a long time (e.g. 30 days), content that was updated prior to 30 days but that the user has never seen need not show as new.

The grid-based nature of the frontline representative assistance application interface 131 makes the interface more accessible than an integrated search system where users need to activate a search box, enter search terms, request a search (by clicking or pressing enter); and then the device queries a search engine or the like and process the received search result to obtain relevant pieces of content. In contrast, using the interface, the front line representative 125 may simply find on the grid formed by the property tabs 150 and the content tabs 140, the grid section (i.e., information pane 145) that corresponds to the information he/she is trying to obtain. The relevant pane 145 presents some initial information; and if that information appears relevant, the representative selects the pane 145 on the device 120 to navigate to one or more additional screens, e.g. modals and/or pages, with more detailed information about the topic(s) identified by the information in the pane 145.

The frontline representative assistance application interface 131 may function as a learning tool in addition to being a reference tool. In one example, the interface 131 allows for fading in/out of a small number of the information panes 145 in the grid to provide a visual cue to the frontline representative 125 about what information is included in the respective information pane 145. The number and order of the highlighting of the panes 145 for training purposes can be purely arbitrary. For example, the particular panes highlighted at any given time need not be linked in any particular way, and the order of highlighting panes may be random or based on another algorithm selected by the administrator. Over a period of time in this mode, the device runs through a sequence to highlight all of the panes 145 at different times, to allow the user to view and learn about the associated information. All of the panes may be selectable at the same time, or only the one or more highlighted panes may be selectable of any given time.

In one example, the representative assistance application interface 131 translates between a web-based and software application-based solution such that the interface 131 can be used on both desktop communications devices and/or mobile communications devices. Further, the representative assistance application interface 131 may include ergonomic considerations in order to support single hand operations for frontline representative's use on the sales floor.

In one example, the frontline representative assistance application interface 131 obtains the information in its tabs and screens from one or more databases that store such information. The databases may be positioned locally within the communications device hosting the frontline representative assistance application interface 131 (not shown) or remotely from the communications device 120 (as shown in FIG. 1). For example, as shown in FIG. 1, the communications device 120 connects, via the communications network 110, to one or more databases 190-1, . . . , 190-*n* that include the information reflected in the frontline representative assistance application interface 131, and obtains the information included its tabs and screens, as well as updates to the information, from the databases 190-1, . . . , 190-*n*. Depending on the storefront or call center utilizing the frontline representative assistance application interface 131, the databases 190-1, . . . , 190-*n* may be maintained by different authorities. For example, referring back to the wireless service provider example presented above, the service provider owning and/or overseeing the operation of the work site maintains the databases 190-1 . . . , 190-*n*.

The databases 190-1, . . . , 190-*n* are often updated to reflect changes to the information included in these databases 190-1, . . . , 190-*n*. This provides the frontline representative 125 with the latest communications and updates to the features or products being represented by the frontline representative 125. As explained previously, the frontline representative assistance application interface 131 provides the frontline representative 125 with a notification (e.g., using the update indicator 171) when the information included in a database 190-1, . . . , 190-*n* is updated.

In addition to providing the frontline representative 125 with information for addressing clients' requests, the frontline representative assistance application interface 131, in one example, provides the frontline representative 125 with the latest available key performance indicators, indicating the performance of the frontline representative 125. The frontline representative assistance application interface 131 may also provide the frontline representative 125 with information regarding pending tasks or tasks needing completion (e.g., client over the phone awaiting service, incoming calls to client helpline, etc.). This results in increased efficiency of the frontline representative 125 and can also increase the clients' service satisfaction level. Examples of additional information/tools like these are discussed later relative to a display (FIG. 10) presented upon user selection of an "Operations" one of the screen tabs 170.

The frontline representative assistance application interface 131, when implemented on a mobile communications device 120, provides the frontline representative 125 with access information needed to address clients' requests without requiring the frontline representative 125 to stop their current task (e.g., tending to the client) to leave the sales floor in order to access a computer and search for the requested information. This can potentially result in reducing the amount of time needed to serve a client and addressing the client's request. In addition, when accessing the frontline representative assistance application interface 131 on a mobile communications device, the frontline representative 125 may be able to present the client with demos, images, real-world applications, etc. of products that the client may be interested in purchasing.

Further, since almost all required information for addressing clients' requests is customized and made available on the communications device display 130, the frontline representative 125 no longer needs to memorize the information or search for the location at which the information is stored and can quickly and directly access the information by selecting the appropriate information pane 145.

The frontline representative assistance application interface 131 simplifies organization of content and categorizes the content such that that frontline representative 125 can easily request and search for the information needed to address clients' requests. Further, the frontline representative assistance application interface 131 may also allow the frontline representative 125 to customize the frontline representative assistance application interface 131 to his/her liking. For example, the frontline representative assistance application interface 131 may allow the frontline representative 125 to select his/her language of choice from among a list of available languages. In response to selection of a preferred language, the frontline representative assistance application interface 131 is presented in the frontline representative's language of choice. The general appearance of the frontline representative assistance application interface 131 may also be customizable. For example, the frontline representative 125 may be allowed to reduce/increase resolution, change font size, background color and design, etc. The enterprise may prefer for some aspects of the assistance application interface 131, such as the tab and/or indicator locations, to be fixed for convenience or to insure a consistent experience for all users. However, the application may also allow the frontline representative 125 to change one or more aspects of the tab configuration and/or the update notice indicator configuration, etc., e.g. to change the location of the tabs or indicators.

By allowing the frontline representative 125 to customize the interface according to his/her liking or needs, the efficiency of the frontline representative 125 in finding and understanding the requested information and addressing the clients' requests is increased.

Figure 2:
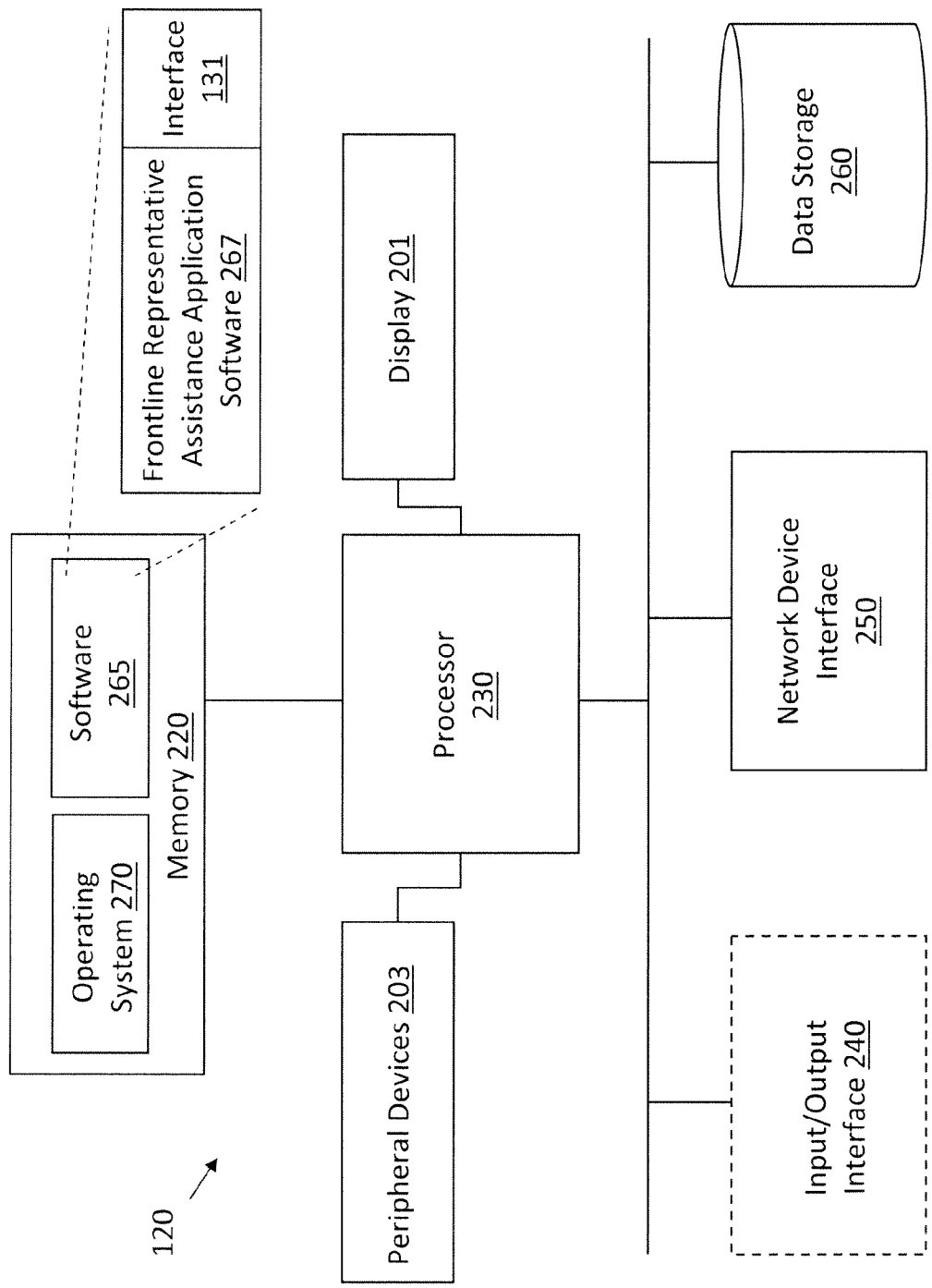
FIG. 2 is a block diagram of an exemplary communications device that is used for launching the frontline representative assistance application interface.

FIG. 2 is a block diagram of an exemplary communications device 120 that is used for launching the frontline representative assistance application interface 131. The communications device 120 includes a processor 230 (e.g., Central Processing Unit) that is coupled to a memory 220 and arranged to carry out the operations of the device, execute various instructions, and manipulate data structures from the memory 220. The memory 220 is any appropriate type of computer-readable memory and may include combinations of volatile and non-volatile memory devices. The memory 220 is configured to hold software 265 and firmware in the form of computer-executable instructions as well as data structures. For example, the memory 220 stores computer-executable instructions and data structures that implement the required procedures for receiving input from the frontline representative 125 and presenting the frontline representative 125 with assistance information in response to the received input in the form of the interface 131 described herein.

Hence, the software 265 includes the application software 267 for providing assistance to the frontline representative 125. The frontline representative assistance application software 267 enables the communications device 120 to provide the frontline representative assistance interface 131 via the input/output elements of the particular type of communications device 120. The software implements, for example, the graphical user interface (GUI) implementation of the frontline representative assistance interface 131, as may be shown to a frontline representative 125 via the display 130 of the communications device 120. The frontline representative assistance application software 267, for example, configures the communications device 120 to populate various display screens and/or fields thereof with assistance information, such as discussed more later with regard to specific examples of the displays that may be provided via an implementation of the interface 131. Hence, the application 267 includes programming both for relevant data processing and for implementing the GUI provided by the input/output elements as interface 131 in our example. Data used to populate the interface display screens may reside in data storage 260 or be obtained from a remote source via network communication.

The memory 220 includes an operating system 270 that implements various conventional operating system functions including memory management and controlled access to various devices, such as a database storage 260, and task and process scheduling. The data storage 260 includes content, for use with techniques disclosed herein, such as images, text, video, audio, and computer applications.

The processor 230 is coupled to various interfaces via an input/output (I/O) device interface 240. The I/O device interface 240 includes logic to interface various input and/or output devices, such as a keypad or mouse with the processor 230, and allow signals and/or data to be transferred between the processor 230 and the external input or output devices coupled to the respective interfaces 240. Further, interface devices, such as speaker 210, microphone 207, peripheral devices 203, and display 201, are used to transfer signals and/or data to/from the processor 230 and the memory 220. For example, as noted previously, the frontline representative assistance application interface 131 appears on the display and the information in the tabs are activated and accessed using the interface devices. The I/O interface 240 may include a USB port (not shown).

The communications device 120 also includes a network device interface 250 that provides the communications device 120 with access to a communications network 110 (shown in FIG. 1).

Hence, the frontline representative assistance application interface 131 and related techniques discussed by way of example herein may be implemented at least in part by computer readable code stored or otherwise embodied in a non-transitory computer readable medium. The computer readable code, such as the application software 267 implementing the frontline representative assistance application and thus to implement the interface 131 in the communications device 120, may be stored or otherwise embodied in a computer readable medium. Non-transitory forms of such a medium, for example, include various types of semiconductor memories, disk storage devices or the like that may be used as the main memory 220 and/or the storage 260 in the exemplary communications device 120 of FIG. 2 or in or for use with other equipment that may hold such software before direct loading or downloading through a network for installation in a particular implementation of the device 120.

Figure 3:
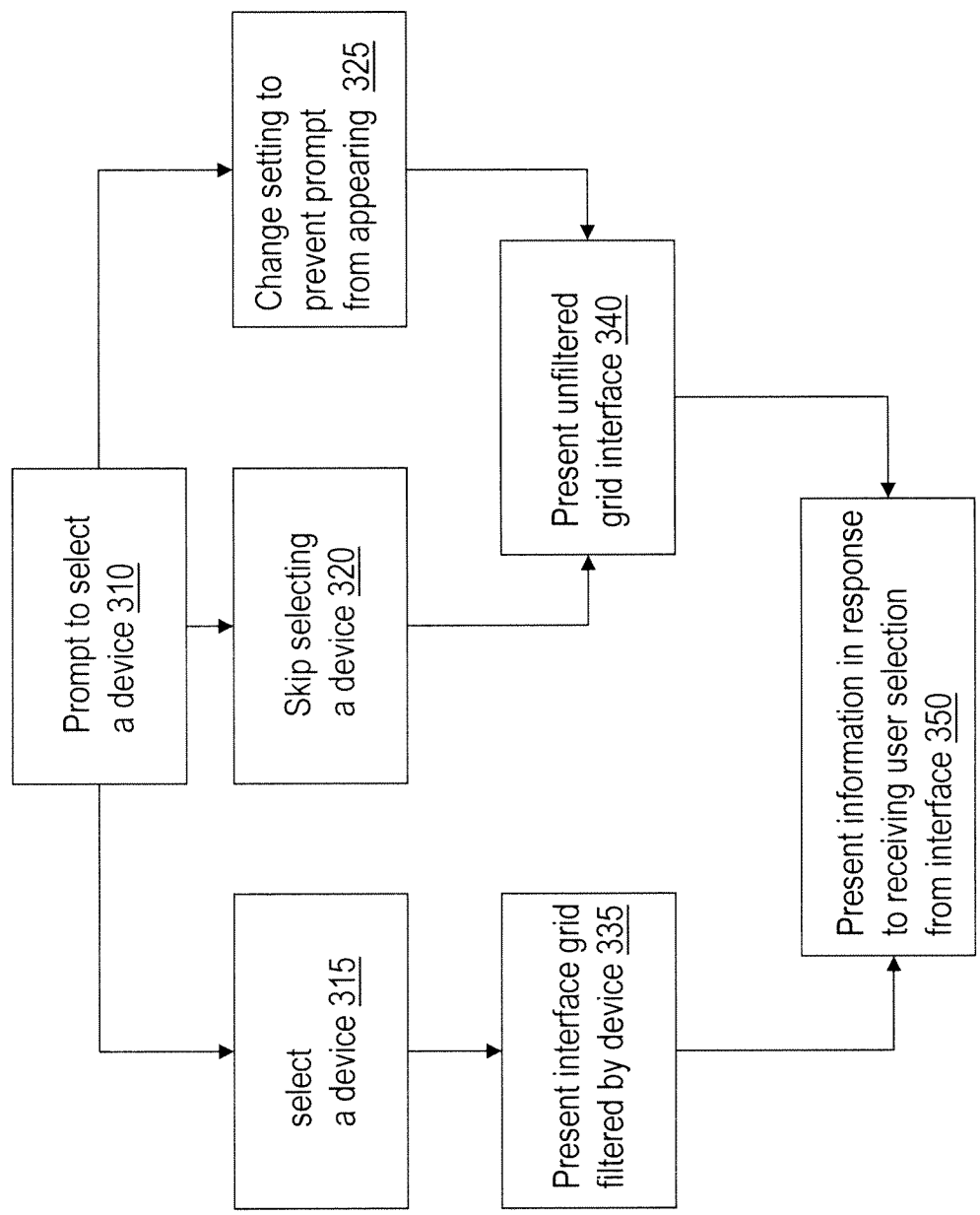
FIG. 3 is a flow diagram of procedures for providing assistance to a frontline representative, for an example of the interface adapted for use at a storefront or call center of a wireless communications provider.

FIG. 3 is a flow diagram of procedures for providing assistance to a frontline representative. As explained previously, the frontline representative 125 is prompted to select a device and/or client location to filter content appearing in the content tabs 140 (block 310). The frontline representative 125 is given the options to a) select a device (block 315), b) skip selecting a device (block 320) and navigate to the home screen, without having the content filtered by selecting a device, or c) select an option to prevent future display of device selection prompt in the future (block 325).

The frontline representative 125 scrolls the list of devices presented in the prompt and selects a device (block 315). If a device is selected, a list of feature devices is presented to the frontline representative and the user is given the option to select from a list of the devices designated by an administrator (block 335). Alternatively, the frontline representative 125 may select an option for displaying all devices or skipping the selection of devices. In such case, the user is directed to a landing page of the interface 131 displaying all available devices. In some examples, the interface 131 is launched in a default page having local and/or regional information stored therein (e.g., local promotions).

If the frontline representative 125 decides not to select a device (block 320), content appearing in the interface, including content appearing under content tabs 140 and property tabs 150 are not filtered according to a specified device (block 340)

If the frontline representative 125 selects the option that prevents future display of device selection prompt (block 325), device selection prompt is not displayed. However, the frontline representative 125 has the option of changing this setting by using screen tabs 170 and accessing a setting screen of the frontline representative assistance application interface 131. In one example, the prompt screen appears again when the communications device 120 is rebooted or reset. In one example, the communications device is arranged such that the prompt appears in response to default keyboard action. For example, the prompt appears in response to pressing any key on a keyboard coupled with the communications device 120.

Once a device is selected, the frontline representative assistance application interface 131 displays the multi-dimensional grid, discussed with reference to FIG. 1, to the frontline representative 125 (block 350). The priority tab 180 includes text that reflects the selected device. The content appearing in content tabs 140, the property tabs 150, and the panes 145 are populated in response to the selected device. The information may be obtained from a database that stores the information, for example from databases 190-1, . . . , **190-*n* (shown in FIG. 1) with the communications network 110**.

Once a device is selected, the frontline representative 125 is able to select other devices for comparing against the selected device. Various factors, such as price, manufacturer, etc. may be used in comparing the devices. The interface 131 also gives the frontline representative the option to switch the selected device and select another device for comparison and obtaining information.

As outlined above, the frontline representative assistance application interface 131 may be adapted for use in a variety of different enterprise contexts to assist enterprise representatives in their interactions with clients or prospective clients, customers or the like (generally referred to herein simply as "clients"). A specific example of an application of the interface 131 is for use by a representative of a wireless communications provider, typically in a store, a call center, etc. To assist in understanding the interface 131 and navigation to various types of information offered via the interface 131, it may be helpful to consider illustrative display screens that may be presented by such an interface in the context of a storefront of the wireless communications provider, although such a provider may utilize similar assistance technologies at other types of work sites such as call centers. For convenience, the screens illustrated in FIGS. 4A to 12B relate to an implementation of the interface 131 for such a storefront application; although of course, the illustrated displays are shown and described only by way of examples.

Hence, the storefront scenario is used for the discussion of the specific examples shown in the later drawings. It should be noted, however, that the device, system and interface may be used for any person/user who wants to access a knowledge repository for a certain piece of information. For example, although intended for use by a representative in the storefront example, the representative may be sales or service personnel; and even a client may be allowed to operate the communications device 120 under some circumstances. The grid layout (number of rows, number of columns, row headings, column headings etc.), and/or layouts of other displays discussed by way of examples below, however, may change in that circumstance, depending on the intended user/representative base; but the paradigm of information access by selecting a pane with at least some of the relevant information at the grid intersection of what the representative perceives as the most relevant content and priority tabs would remain the same.

As noted above, for a wireless communications provider, the frontline representative assistance interface 131 may prompt a user to select a device (see FIG. 3 and discussion of step 310 above). Hence, the examples of FIGS. 4A to 4C show display screens configured to prompt for and accept inputs related to select one of the devices available from the wireless communications provider (or for use on the network of the wireless communications provider).

Figure 4A:
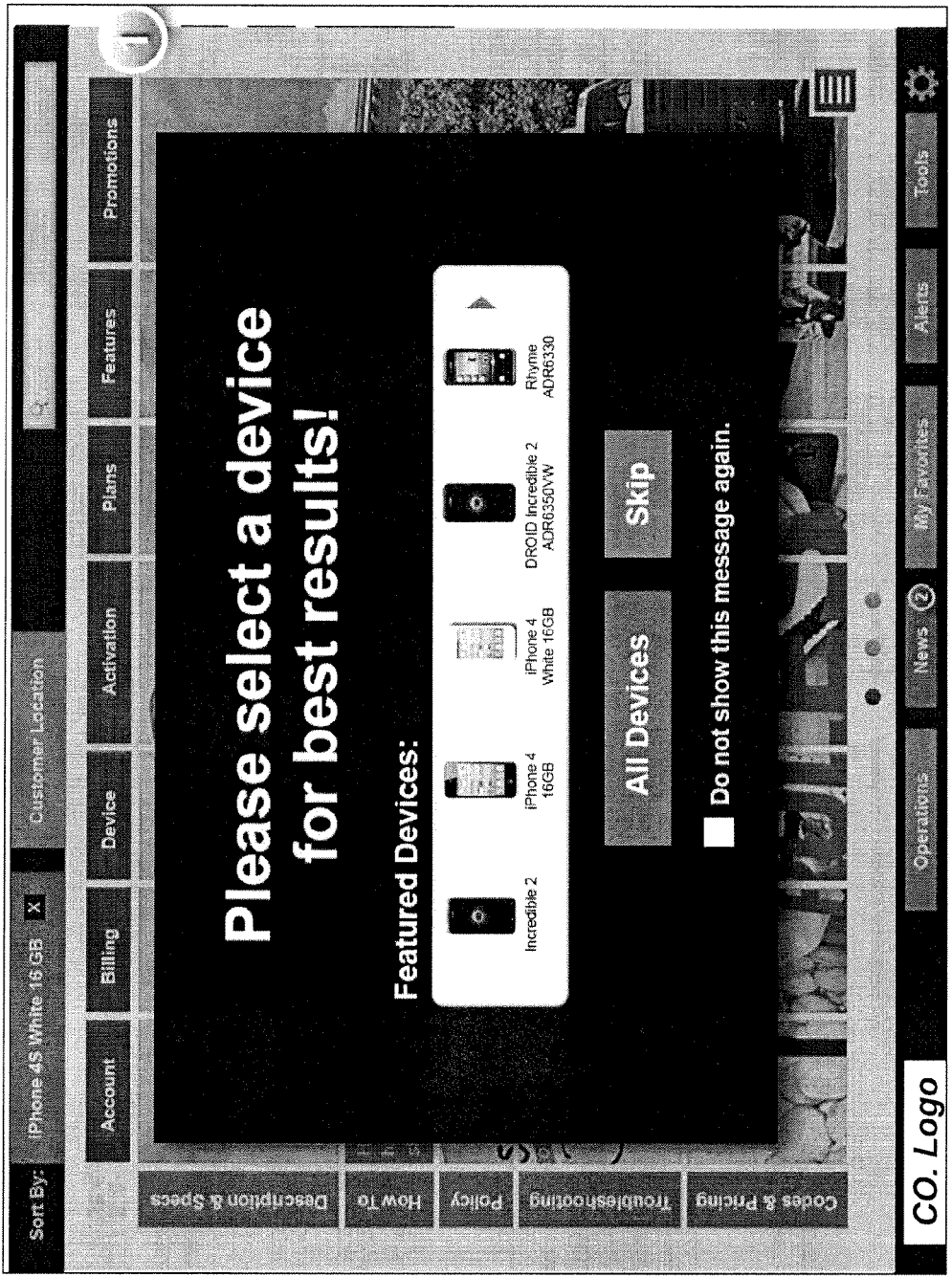
FIGS. 4A to 4C depict examples of screens that may be displayed as a user initially selects a device, as part of the example for use in the storefront of the wireless communications provider.
Figure 4B:
Figure 4C:
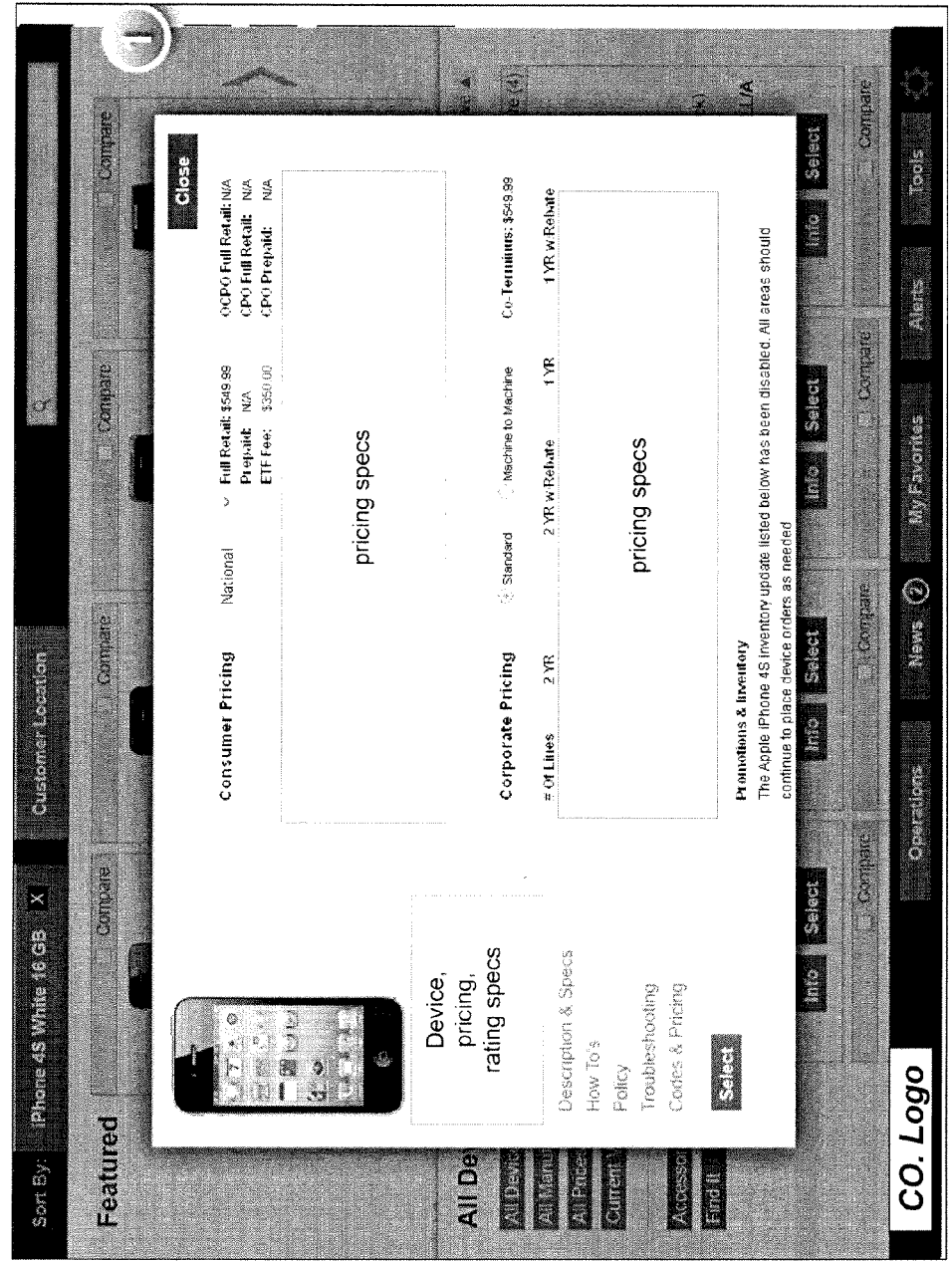

FIG. 4A shows an example of a device selection modal, in this example, overlaid over an example of the interface grid with the grid somewhat darkened in the background. In operation of the device 120 in the wireless communications provider store, at first selection of a reference content screen, the interface 131 presents such a device selection modal like that shown in the drawing, to prompt the representative 125 to select a mobile device and/or customer location to filter the content that is to be provided by the interface on the communications device 120 during succeeding navigation through the assistance interface 131.

As noted earlier, the communications device 120 may be any of a variety of different user devices or terminals appropriate for a particular enterprise worksite. Although the communications device 120 may be dedicated to client assistance; in other implementations, the communications device 120 may be configured to implement other functions of the particular enterprises, such as a point of sale (POS) terminal otherwise used for instituting sales transactions and/or a computer terminal of a billing system for handling billing inquiries, account payments or the like. If the representative 125 is entering data from a POS terminal or a terminal of a billing system, then information about the account, the client's mobile device and/or location may be automatically populated by such a terminal or system. If not auto-populated, for example, if the representative is using a device dedicated to client assistance, then the modal may offer the representative various choices to select a device. In the example, the representative can select from among a number of "Featured Devices," such as from a list of a number of (e.g., fifteen)

devices designated by an administrator. These devices may be, e.g., the most popular in terms of purchase over a predetermined period, such as the last month. The modal of FIG. 4A also allows the user to select an "All Devices," option, to navigate to a device selection landing page such as that shown in FIG. 4B.

The modal of FIG. 4A also includes a "Skip" option, which allows a representative to navigate to the grid home page; but if the home page is reached in that manner, content on the home page is not filtered by device.

The interface 131 may offer the representative 125 an ability to select an option or setting not to display the device selection modal in the future. In such an implementation, however, a representative would likely be able to reactivate the device selection option in settings section of interface application located in the bottom navigation (represented by a gear wheel icon in several later views). When initial selection is turned off, via settings, the user still can select a device via navigation options available on various screens displayed during further navigation via the interface 131.

The communications device 120 may be configured to display the device selection modal (FIG. 4A) only on reboot or startup of the interface application or upon close of a browser on a computer type device. A default keyboard action may be navigation to "All Devices," For example, if a representative 125 presses Enter on a computer type device, the interface navigates to the device selection landing page, such as that shown in FIG. 4B.

FIG. 4B depicts an example of a device selection landing page. From such a page, a representative is able to select from a list of featured devices as well as from the full list of devices. The example shows a screen layout in which four of the featured mobile devices are shown with a small image and some associated text information, across an upper section of the screen. Similarly, four mobile devices from all devices on the list are shown with a small image and some associated text information in a lower screen section designated for all devices. The representative can scroll the display of featured devices by selecting the horizontal arrow (pointing right in our example), or the representative can navigate to see additional devices from the all devices category by scrolling down while in the all devices section of the page. In the example, the all devices panel displays the text "Move" to clearly indicate that the panel can slide. Alternatively, a touch screen implementation of the communications device 120 may allow the representative to scroll up/down or sideways through either or both of the lists by swiping (e.g. touching and dragging) the list that the representative wants to scroll through.

From a device selection landing page like that shown in FIG. 4B, the representative is able to operate the communications device 120 to select any of the devices represented on the landing page. On a touch screen device, for example, the user merely touches the screen in the area showing the "Select" button for mobile device that the representative intends to select. On a PC or the like, the representative operates a cursor control device such as a mouse, trackball or touchpad, to highlight and "click" the "Select" button for the mobile device that the representative intends to select. Selecting a mobile device causes the communications device 120 of the representative 125 (FIG. 1) to navigate through the interface to the homepage (FIG. 5A or FIG. 5B, as discussed later), with the currently selected device displayed in the top banner and the content of the homepage filtered by selected device.

The device selection landing page of FIG. 4B also offers the ability to click an Info button, which will cause the communications device 120 of the representative to navigate through the interface 131 to display a device specific modal, an example of which is shown in FIG. 4C (discussed more below).

The frontline representative assistance application interface 131 may offer the representative a number of other navigation options with regard to mobile devices that are available for selection from the device selection landing page. For example, the interface may offer a quick search by device. As another example, more detailed device comparison may be offered by user selection of a "compare" box at the top of the area for particular devices shown on the page. In this later case, the representative may be able to select and compare up to four devices. The interface may present an error message when the representative has reached the fifth attempt at a selection. The "compare" link may also track and show the selection count up to four.

The all device section of the page shown in FIG. 4B may also allow a representative to filter the devices displayed in this section in a variety of ways, such as network type (e.g. 3G or 4G), device type (e.g. smartphone, netbook, tablet, basic phone), or manufacturer. Devices also can be sorted in this section in a variety of ways, for example, alphabetical by manufacturer, alphabetical by model, price (Low to High or High to Low) and customer ratings. Device ratings, for example, may be available from a database maintained by the wireless communications provider and supplied to the assistance information database. Alternatively, ratings could be obtained for the assistance information database from external sources, such as on-line social media sources.

The exemplary device selection landing page of FIG. 4B also offers related information selections. For example, a representative may be able to click on the "Accessories" button and navigate to an Accessories landing page. Another interface option from the page of FIG. 4B may be to click on the "Find It" button and navigate to a Find It landing page for further searching.

As noted earlier, a user selection on the device selection landing page of an Info button will cause the communications device 120 of the representative 125 to navigate through the interface 131 to display a device specific modal, an example of which is shown in FIG. 4C.

The content section of the device modal may display a variety of information about the particular mobile device. In the example, the modal displays the selected device's pricing information. The information section of the modal may be scrollable.

From a device modal like that of FIG. 4C, a representative 125 can click on the thumbnail, the device title for the device, and/or a "Select" button and navigate the interface to the grid homepage; after which, the assistance application software 267 will filter content displayed on the grid of the homepage presented via the interface 131 based on the selected device.

The device modal may also allow a representative 125 to select from a list of links that direct users to various corresponding relevant pages, such as Description & Specs, How To's, Policy, Troubleshooting or Codes & Pricing, which may be the same as or similar to pages displayed in response to user selections of panes under the Device column of the grid, as discussed later with regard to specific examples.

In the example of FIG. 4C, the modal also includes a "Close" button. Selection of the Close button causes the communications device 120 to close the modal without a device selection or other action and return to the device selection landing page of FIG. 4B.

Selection of a device from the landing page of FIG. 4B or from the modal of FIG. 4C exemplifies the device selection step 315 in the process of FIG. 3.

Figure 5A:
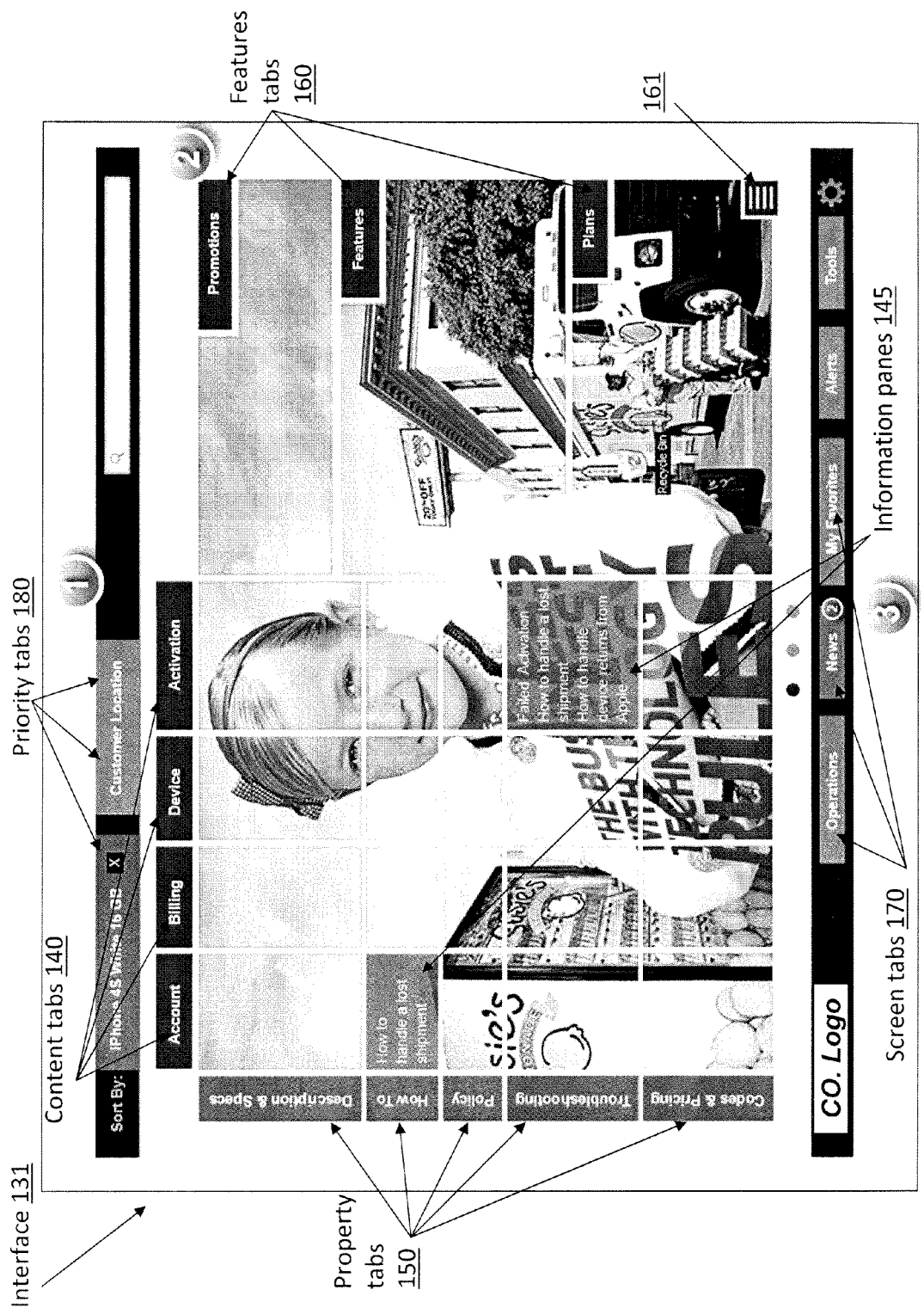
FIGS. 5A and 5B show the content homepage of the interface, including the grid, in two different operation modes.
Figure 5B:
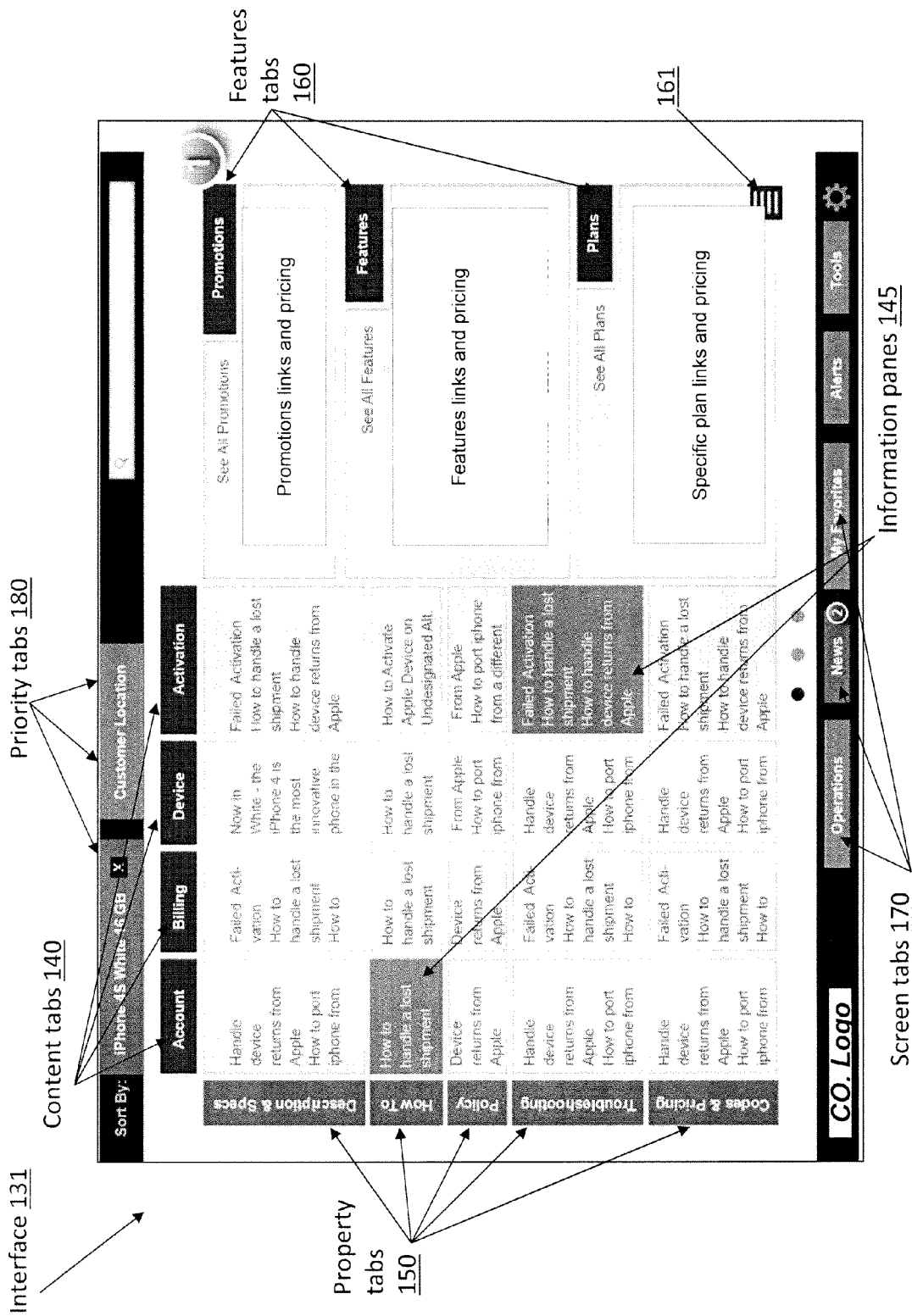

FIGS. 5A and 5B show the content homepage of the interface 131, including an interactive multi-dimensional grid display analogous to the example shown in FIG. 1. FIGS. 5A and 5B show the interface grid display in two different operation modes (corresponding to grid display step 350 in the process of FIG. 3). FIG. 5A is an example of a reference content homepage, using the interactive grid display, in an example in which a representative of the wireless service provider has already selected a particular example of a mobile device. The grid is overlaid on a background image or wall paper, with information appearing in only a small number, that is to say two in the example, of the panes or boxes of the grid. FIG. 5B is an example of a reference content homepage after device selection with text view of content available in all the boxes of the grid. A representative can switch from image to text view by clicking text icon button 161, at bottom right corner of the grid in the examples.

Both examples of the interface 131 show the various tabs as well as the grid with the panes. More specifically, in both exemplary modes, the multi-dimensional grid displayed by the interface 131 for the reference content homepage includes content tabs 140, positioned horizontally in the interface 131. The content tabs 140 represent a number of primary categories that are available to be searched by the frontline representative 125 using the device 120. In the examples, the content tabs 140 include tabs for Account, Billing, Device and Activation categories.

The interactive multi-dimensional grid displayed by the interface 131 for the reference content homepage also includes a number of property tabs 150, positioned vertically in the interface 131. The property tabs 150 represent sub-categories corresponding to the topics covered in each of the primary content tabs 140. The property tabs 150 include a number of sub-topics for the main categories represented by the content tabs 140. In the examples of FIGS. 5A and 5B for the wireless service provider storefront, the property tabs 150 may include sub-categories for Description & Specifications, How To (e.g. operation instructions), Policy, Troubleshooting, Codes & Pricing.

The multi-dimensional grid displayed by the interface 131 for the reference content homepage also includes a number of sections or boxes, shown as panes 145, essentially at the intersections of the columns and rows of the content tabs 140 and the property tabs 150. Some amount of information can be displayed in each pane 145. In the example of FIG. 5A, the text is shown in only two of the panes 145 at a time, although the device 120 will go through a sequence of such two-at-a-time displays to display the text associated with all of the panes over some period of time. In the example of FIG. 5B, the text appears in all of the panes 145, although only two panes are highlighted. As noted earlier, the highlighting of the selected panes may be used, for example, to implement a training mode. The number and order of the highlighting of the panes 145 can be arbitrary. For example, the particular ones highlighted at any given time need not be linked in any particular way and the order of highlighting may be random. In the examples, for training purposes, two panes are highlighted at any given time to emphasize some but not all of the text of the grid and thus shorten the learning curve of the users by showing them some of the content that is behind the grid for each of the boxes or panes. The randomly selected panes in the example stay on for a few seconds before transitioning. The timing for the highlighting can be modified by the system administrator.

The grid layout allows users to select from two choices, at any pane 145 corresponding to an intersection of a row extending from a property tab 150 and a column below a content tab 140, for example a pane corresponding to How To/Account. The interface 131 allows the user to select one of the panes from the grid. In the example, all of the panes may be selectable at the same time; although an alternate implementation might allow selection from among only the highlighted pane(s), e.g. as part of a training exercise. Upon selection of a pane 145, communications device 120 presents appropriate content. If there is a single content item corresponding to the current filter states (e.g. device and/or customer location) for that intersection of two choices, then the pane may display that single content item or display a navigation instruction such as a link to a single content page.

In the example of FIG. 5A, grid sections or panes 145 are highlighted, for example, with blue background and white text, two at a time for some relatively short period of time, with alternating intervals. The sections fade in and out as the interface sequences through, and highlights, all of the panes at different times. Within each highlighted pane 145, the display shows the text the same as or similar to text shown in the particular pane in the Text Grid View (FIG. 5B). For example, when highlighted as in FIG. 5A or filled in as in FIG. 5B, a pane 145 may show the first line of links or other text for the next modal or detailed reference page that the interface 131 may display should the user select the respective pane 145.

In our examples of the interactive multi-dimensional grid (FIGS. 5A and 5B), the areas forming the panes 145 are clickable. The content and property tabs 140 and 150 in the top header and the left bar are not clickable in this example.

The text in a given pane 145 may be sufficient to answer some questions; or in many cases, the text in a particular pane 145 will guide the representative as to what further information is available upon navigation through the interface by selection of that pane by appropriate operation of the communications device 120.

As noted, the interface 131 also includes priority tabs 180, shown along the top edge of the interface display by way of example. In this example of FIGS. 5A and 5B, one of the priority tabs 180 relates to the selected mobile device. If a device has been selected, the type of device is shown in that tab, and the information content displayed in the panes 145 of the multi-dimensional grid is filtered accordingly.

Selection of the Device selection tab in the top banner navigates the display via interface 131 away from the homepage grid and offers options to remove a selected device and/or to select a new device. In our examples, if the user chooses to remove a device by clicking on the "X" associated with the Device tab, an alert box may be provided to confirm that the user really does want to remove the selected device. At that point, the representative in our example would have three options. The first option (Yes) is to go ahead and remove the previously selected device, at which point the grid will display content not filtered by device. The second option (No) would simply return to the homepage with content still filtered based on the previous device selection. The third option would be to select another device, in which case, the communications device 120 navigates through the interface 131 back to the device selection landing page (e.g. a page like that shown in FIG. 4B).

If no device is currently selected, the Device tab in the top banner may display "Select a Device." In that state, user selection of that tab would navigate the user to the device selection page.

Another priority tab 180 in this example relates to customer location. In an example of the interface 131, selection of the Customer Location tab in the top banner causes the communications device 120 to navigate through the interface 131 to a modal for user entry of customer location information. Such a modal might display a prompt and a field for entry of the customer's zip code. In response, the system could determine the customer's location from the entered zip code and display the correct customer location. If a customer's location is displayed, an "X" associated with the Customer Location tab in the top banner would allow the representative to remove or change customer location in a manner similar to that discussed above relative to removing or changing the device selection using the "X" associated with the Device tab.

The bar with the priority tabs 180 may also include a search box. If selected, a representative is able to search all content offered on the device 120 by the assistance application.

The interface 131 also includes screen tabs 170, shown along the lower edge of the interface display by way of example. User selection of a screen tab 170 enables the communications device 120 to launch other software or applications for use in serving the clients or tending to the matters pending at the work site. In the example, the screen tabs 170 provide the frontline representative 125 with access to Operations, News, Favorites, Alerts, Tools and Settings, although other tabs 170 for other navigation functions may be provided instead of or in addition to those shown. Navigation via the tabs 170 gives a user-representative quick access to pages related to the indicated topics.

For example, selection of the My Favorites or Tools tab causes the communications device 120 to display a flyout of links for the user to select. The My Favorites flyout would display the user's favorites and folders. This flyout navigation to a Manage Favorites landing page allows a user to Manage Folders and Favorites. Although not shown, the Manage Favorites landing page may offer the user options to create and delete folders and/or move links from folder to folder and up and down a list.

In the example represented by the drawings, selection of the Operations or News tabs causes the communications device 120 to navigate the interface display to the corresponding Operations or News panels. Use of the Alerts page causes navigation to page for managements of alert messages that may be sent to the communications device. Examples will be discussed later with respect to FIGS. 10-12B.

The Settings tab (shown in the form of a gear wheel icon in the example) allows the representative to update settings of the application software for implementing the frontline representative assistance application interface 131. Although not specifically shown, the Settings option which is activated upon user selection of the gear wheel icon, for example, may allow a user to turn features of the interface 131 on or off. As another example, the Settings panel may allow a user to turn on or off the initial device selection modal which launches at complete reboot of the assistance application or at close of a browser on a computer implementation of communications device 120.

In the exemplary screen display images, the grid often appears as an overlay of a background image. For example, in the first mode illustrated by FIG. 5A, the grid is shown overlaid on an image, with text presented in only two of the panes 145 of the grid. The background image may be updatable by a system administrator.

In an example with key data input, a default key action may be "Search" after a query is entered via the keys. In such an example, a "Search" button would be active on a tablet type communications device 120; and an "Enter" button would be active on a computer type device. A grey "Search" button may be displayed on the computer.

As noted, FIG. 5B shows multi-dimensional grid of the frontline representative assistance application interface 131, when operating in a text mode. Generally, the operations from the text grid layout are similar to the operations from the grid shown in FIG. 5A and described above. For example, the grid text allows the representative using the device to select from two choices at the pane representing the intersection of the desired column and row tabs. The interface may be configured to allow selection of any pane 145 showing text; or the text mode may temporarily highlight pairs of panes 145 for short periods in a sequence and allow user selection from among the highlighted panes at any given time. In each pane 145 of the text view represented by the example of FIG. 5B, the interface displays the first line of links or other text for the next modal or detailed reference page that the interface may display should the user select the respective pane 145. As such, each pane 145 displays some text corresponding to the intersection of a category (e.g. Account, Billing, Device or Activation) represented by a content tab 140 and a sub-category (e.g. Description & Specs, How To, Policy, Troubleshooting or Codes & Pricing) represented by a property tab 150. As discussed earlier, selection of a pane 145 causes the device 120 to navigate further to provide more of the relevant information.

The multi-dimensional grid displayed by the interface 131 for the reference content homepage also includes a number of panes and associated features tabs 160, in this example, positioned vertically along the right side of the grid of the interface 131. In the examples, the interface 131 allows selection to obtain information regarding Promotions, device Features and mobile service Plans. As shown in FIG. 5B, in the text mode, the associated panes are populated with corresponding information on the topics indicated by the respective features tabs 160.

As shown in the text mode of FIG. 5B, the pane associated with the Promotions tab displays the top area promotion for the currently selected device, determined by popularity or administrator's choice. The interface may also offer an option to navigate to All Promotions landing page modal.

The pane associated with the Plans tab displays the top plan for the currently selected device in that area or as determined by administrator. The interface 131 may also offer the representative an option to navigate to an All Plans landing page modal.

The pane associated with the Features tab displays top features for the currently selected device in that area or as determined by administrator. The interface 131 may also offer the representative an option to navigate to an All Features landing page modal.

The clickable sections in Promotions, Features and Plans are the links in the associated panes. Each such link enables navigation to the corresponding content. Any of the "See All . . . " links enables navigation to the corresponding section modal.

Figure 5C:
FIG. 5C shows an example of an alternate homepage layout.

FIGS. 5A and 5B are presented in the drawings and described by way of examples of displays screens that may be offered by the assistance interface 131, which include a multi-dimensional grid. However, other grid layouts may be used in the same or a different instance of the interface 131. To illustrate, FIG. 5C depicts an alternate homepage layout. The grid of FIG. 5C provides priority, property and features tabs as well as corresponding panes, generally like in FIGS. 5A and 5B. However, the sizing and styling of several of these elements of the grid layout are somewhat different in the layout of FIG. 5C. The example of FIG. 5C is similar to the view of FIG. 5A in that one pane at an intersection of a column and a row is highlighted, although a similar homepage layout could be readily adapted to offer a text view more like the view of FIG. 5B. The differences in these diagrams are the layout and manner of dividing the grid. It should be readily apparent that the application/interface/system using the grid as part of the user interface potentially can be used for any person/user who wants to access a knowledge repository for a certain piece of assistance information. The grid layout (number of rows, number of columns, row headings, column headings etc.) may change for different uses or circumstances, e.g. for different applications within an enterprise or when used by different enterprises; but the paradigm of information access remains the same. The further discussions of examples in the later drawings assume a homepage configuration like that of FIGS. 5A and 5C, although similar screens may be adapted to an interface utilizing a homepage layout more like that of FIG. 5C.

As outlined above in the discussion of FIG. 5A and FIG. 5B, user selection of a pane 145 from the multi-dimensional grid displayed by the interface 131 causes the communications device 120 to navigate the interface display to a more detailed page. This operation provides at least a first layer of further information presentation corresponding to the step 350 in the process of FIG. 3.

Figure 6:
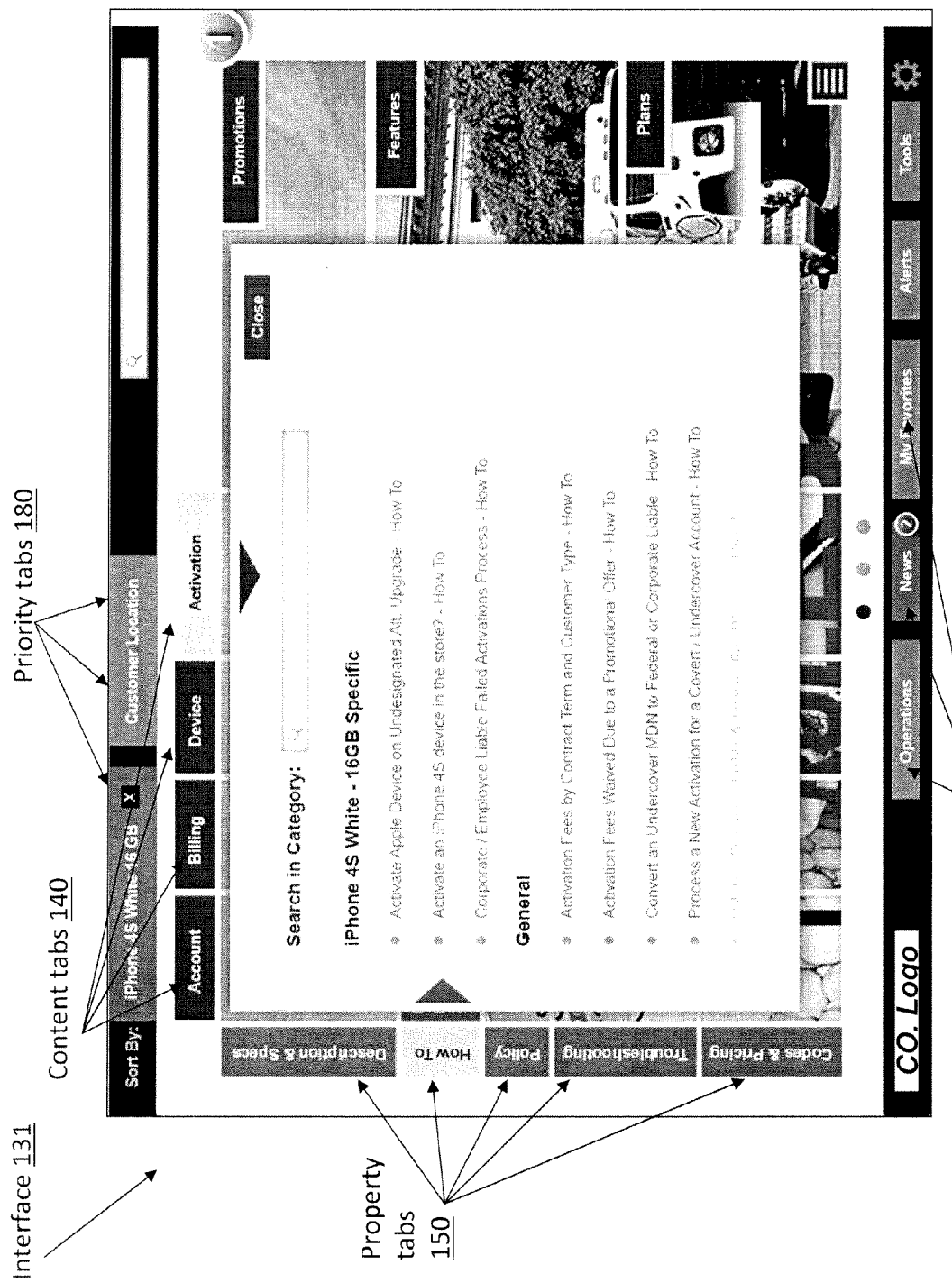

For example, such navigation may next present a reference content selection modal. FIG. 6 shows an example of a reference content selection modal, as may be presented in response to a user selection of the grid pane 145 at the intersection of the "How to" row and the "Activation" column. Arrows associated with the relevant tabs are used in this example, to indicate to a person viewing the modal the relevant category and sub-category.

The grid and/or background image may be at least partially visible behind the modal. The tabs 140, 150 and 160 around the grid are visible but not selectable. The tabs 170 and 180 are also visible and may be selectable. Selection of a tab 180, for example, may enable a device or location change and cause a corresponding change of the filtering of content used to compile the information reference content selection modal and thus a change of content shown in the modal. Selection of a tab 170 would cause navigation away from the modal, in a manner similar to navigation responsive to selection of such tabs described earlier.

Although other formats may be used; in the exemplary reference content selection modal of FIG. 6, the interface 131 presents to the user-representative a list of links to more specific reference content on several points corresponding to the two choices combined in the selection of the relevant pane from the grid. The links may be device or location specific and/or to general content. In the example of a reference content selection modal with respect to the selected combination of "How to" and "Activation," there are several links relating to how to questions about activation of the currently selected device as well as links relating to several general topics, shown in two different sections of the illustrated modal.

From the exemplary reference content selection modal of FIG. 6, the user can close the modal page and return to the home page (e.g. as in FIG. 5A or FIG. 5B). The example provides a "Close" button, although other buttons or activation techniques may be used to close this modal (or any other page of the exemplary frontline representative assistance application interface 131).

In the exemplary reference content selection modal, the frontline representative assistance application interface 131 allows the representative to scroll through device-specific items and through the general content items. The modal also offer an option to search within the category of that section. Again, the key activation operation would default to a "Search" function, whereby after key entry of a query, a "Search" button would be active on a tablet or an "Enter" button would be active on a computer.

Figure 7:
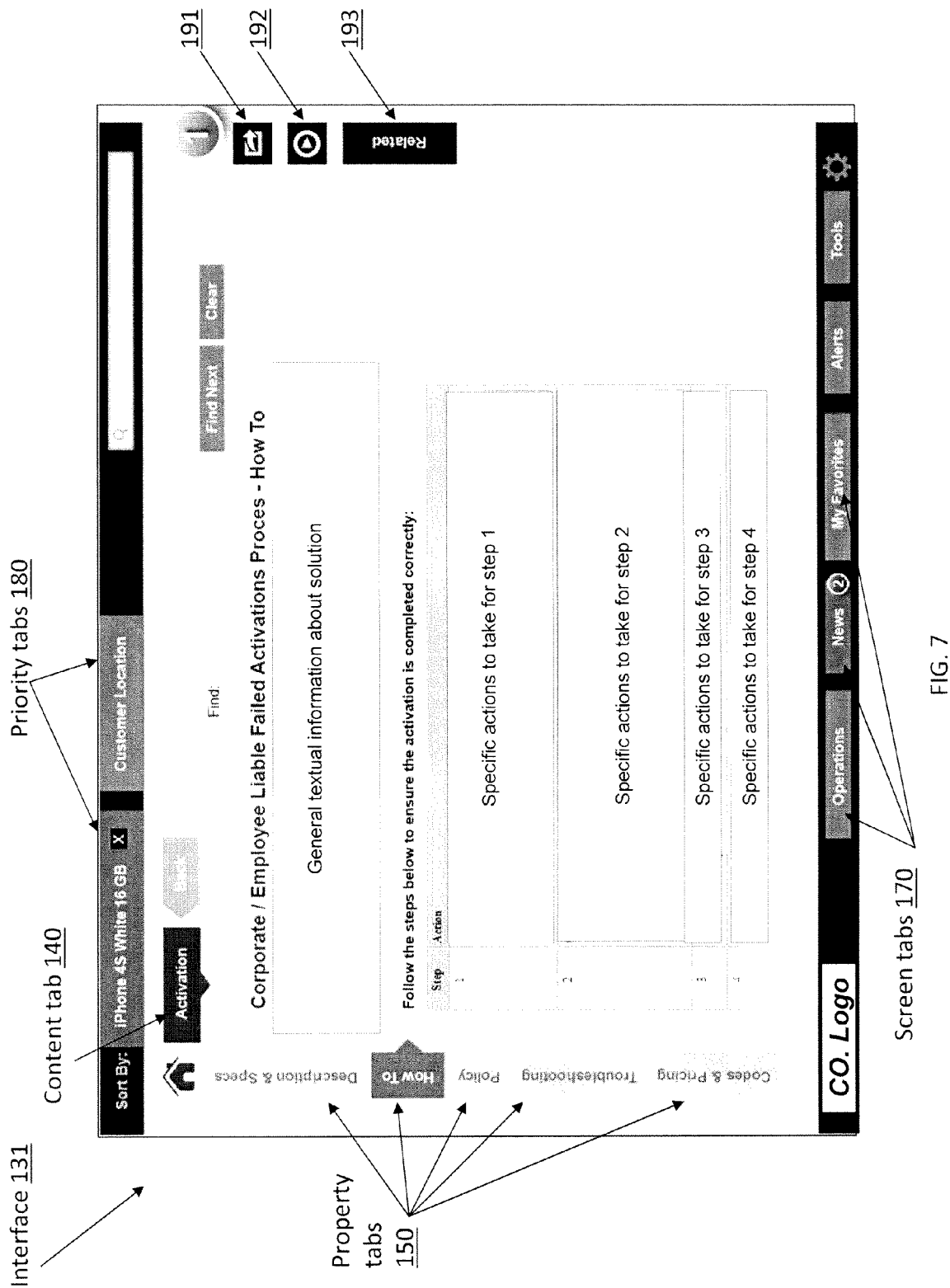

From the exemplary reference content selection modal, the user selects a displayed link to cause the communications device 120 to navigate through the interface 131 to display a content detail page on the desired topic. FIG. 7 is an example of a reference content page, which the communications device 120 presents via the interface 131 in response to a selection of one of the links in the page of FIG. 6. The drawing shows an exemplary content page as might be presented in response to user selection of the "Corporate/Employee Liable Failed Activation Process—How to" link from the exemplary reference content selection modal.

A reference content page like that of FIG. 7 presents a single content page displaying the selected content from the assistance database. In this example, the information presented on the reference content page offers the most detailed information available from the system, on the topic selected to this point in the user's navigation through the interface 131.

The screen and priority tabs 170 and 180 are visible and may be selectable from the display of the reference content page. Selection of a priority tab 180, for example, may enable a device or location change and cause the filtering of reference content to change and thus change the information presented on the page. Selection of a screen tab 170 would cause navigation away from the reference content page, in a manner similar to navigation responsive to selection of such tabs described earlier.

The property tabs 150 along the left side of the grid are visible, and several of those tabs are selectable when the interface is displaying the reference content page. The tab corresponding to the presently displayed content is shown in a different color and is not selectable. Selection of any of the other property tabs 150 enables further navigation. In this way, the representative using the communications device 120 is able to navigate to other sections of the content under the currently selected content tab 140. In the example, this would allow navigation to other reference content pages under the general topic or category Activation, but corresponding to Description, Policy, Troubleshooting, and Pricing & Codes sub-categories, instead of the currently selected "How To" content page in the illustrated example.

Only the one of the content tabs 140 that corresponds to the presently displayed content is shown, and that tab is not selectable. In this example, a back button is shown beside the one content tab 140. Selection of the back button allows the user to navigate home, e.g. back to the preceding modal. Alternatively, a button link or the like could be provided to navigate back to the appropriate modal or homepage of the interface 131.

As shown by these pages (FIGS. 5A to 7), substantial relevant information is available to the user in the initial grid displays before any search or selection. The information initially presented in the multi-dimensional grid may be filtered, e.g. by device and/or location in our example. From the grid (FIG. 5A or FIG. 5B), one click of the appropriate grid block or pane reaches the reference content selection modal (FIG. 6) and a second click of a link on that page reaches a reference content page (FIG. 7) with frequently requested information relevant to a topic of interest, which often will be useful or assist the representative in addressing a client inquiry. As such, the frontline representative assistance application interface 131 provides fast effective navigation to relevant information from an assistance database.

At least in the example, the reference content page (FIG. 7) may offer an additional search option, represented by a search box in combination with Find Next and Clear buttons. The search at this stage of navigation through the frontline representative assistance application interface 131 searches content displayed on the page, to allow the representative or other user to hone in on desired content within the displayed page. For example, use of the search box may cause the communications device 120 to highlight words in the displayed content page that have been entered by the user. The search query may highlight in a particular color in the body of the content as the user types the query. For example, if a user types "y" the page should jump to the first word that has a "y" as the beginning letter and highlight the letter. If no words match the user's search query, the box may display informative text such as "No Matches Found." Links in the displayed content may also be searchable. When the search results in a jump to a text entry in the page, the user can initiate a jump to a next word corresponding to the query by clicking "Find Next." Although not shown a user may be able to go to a previous result by clicking a "Previous." The "Previous" button would be displayed (in addition or as an alternative to the Find Next button) only when a user has advanced through a search. Selection of a "Clear" button may cause the communications device 120 to clear the search box displayed on the reference content page. The search of the reference content page may highlight some number of matching search results (e.g., 2 or 3).

The exemplary interface also offers several options for opening a relevant side bar for processing of information from the reference content page (FIG. 7). These additional navigation options may be implemented with buttons or tabs or other visible navigation elements or from a menu. In the example, three such additional navigation options are offered by an Action icon 191 (to Share, add to Favorites and/or provide feedback); a Video content icon 192; and a view Related content icon 193.

Several examples of side bars appear in FIGS. 8A to 8E. Each side bar appears as a panel overlayed on top of the reference content page extending inward from a side, e.g. from the right side of that page. The icons are still visible, although the icons are now positioned along the inner edge of the side bar. Other display formats for selecting and offering options similar to those of the exemplary side bars may be used.

In an example of the interface, each side bar panel is accessible by clicking on the respective icon or swiping the icon or far right side of the display. When the side bar panel is hidden, the icons may be particular selected color, for example, black. When the side bar panel is displayed in the out position, only the active icon may be in the selected color whereas the hidden side bar icons are another color (e.g. grey) but active so that the user can navigate to the other side bars.

Figure 8A:
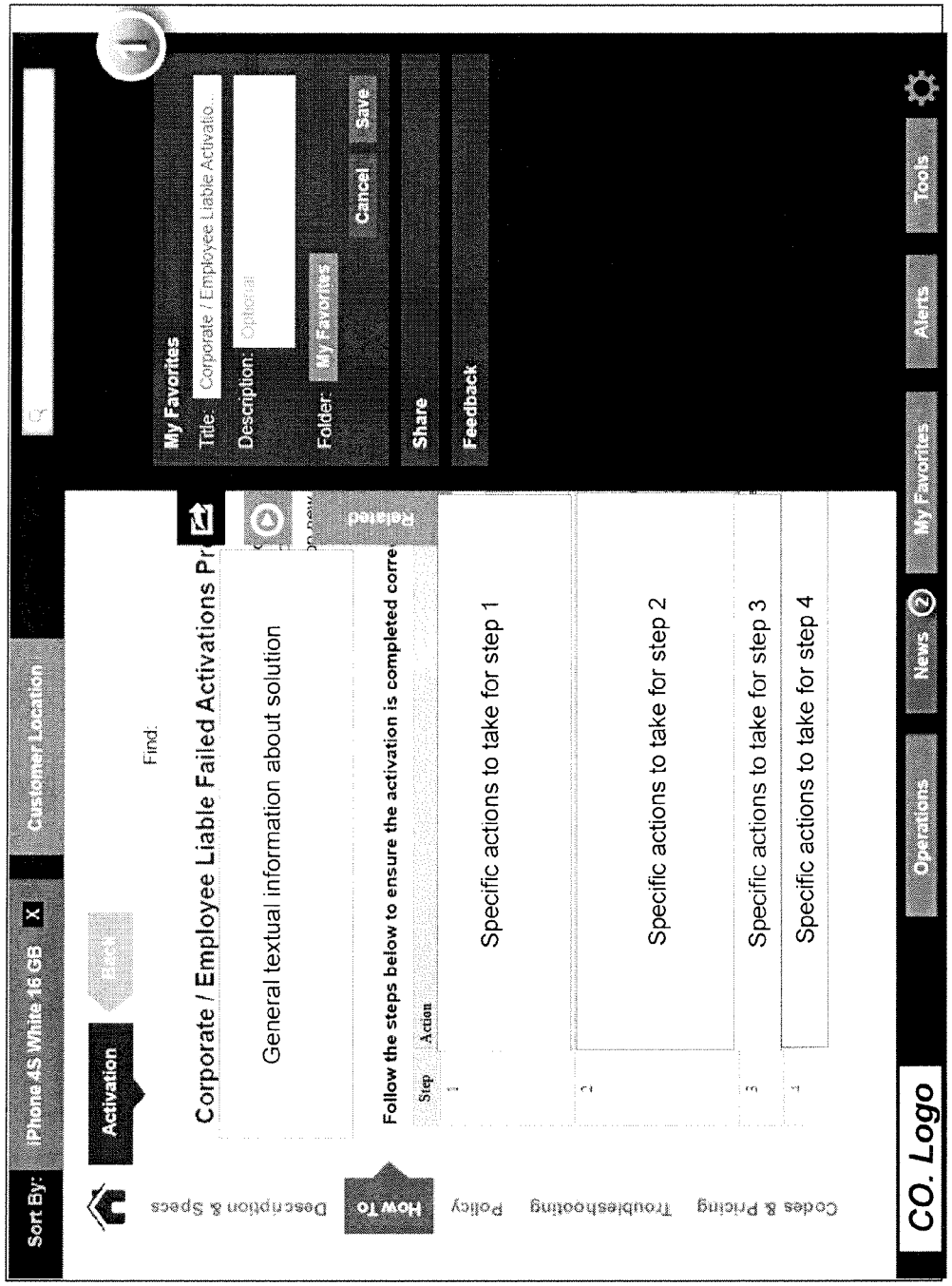

Selection of the Action icon 191 causes the device to open an appropriate side bar over the reference content page. FIG. 8A shows this first type of side bar in a mode in which the user has opted to add the current reference content page to the user's Favorites. In the example, the representative can see the title of the content they want to save and add a description. The link to the current page may be saved to a default folder, or the user can select another folder from the side bar. The default folder, for example, may be a "My Favorites" folder or the last folder the user selected on a previous visit to the assistance information application and favorites input side bar. The example also allows the representative to cancel the save-to-favorites operation by clicking a "Cancel" button which removes content entered in fields by the user and closes the sidebar. When the representative has entered the relevant information in the exemplary fields, the user saves the link to the current page by clicking "Save". The default keyboard action in this mode may be "Save," so that after fields are entered, the "Save" button should be active on a tablet or the "Enter" button on a computer to initiate the save operation.

Figure 8B:
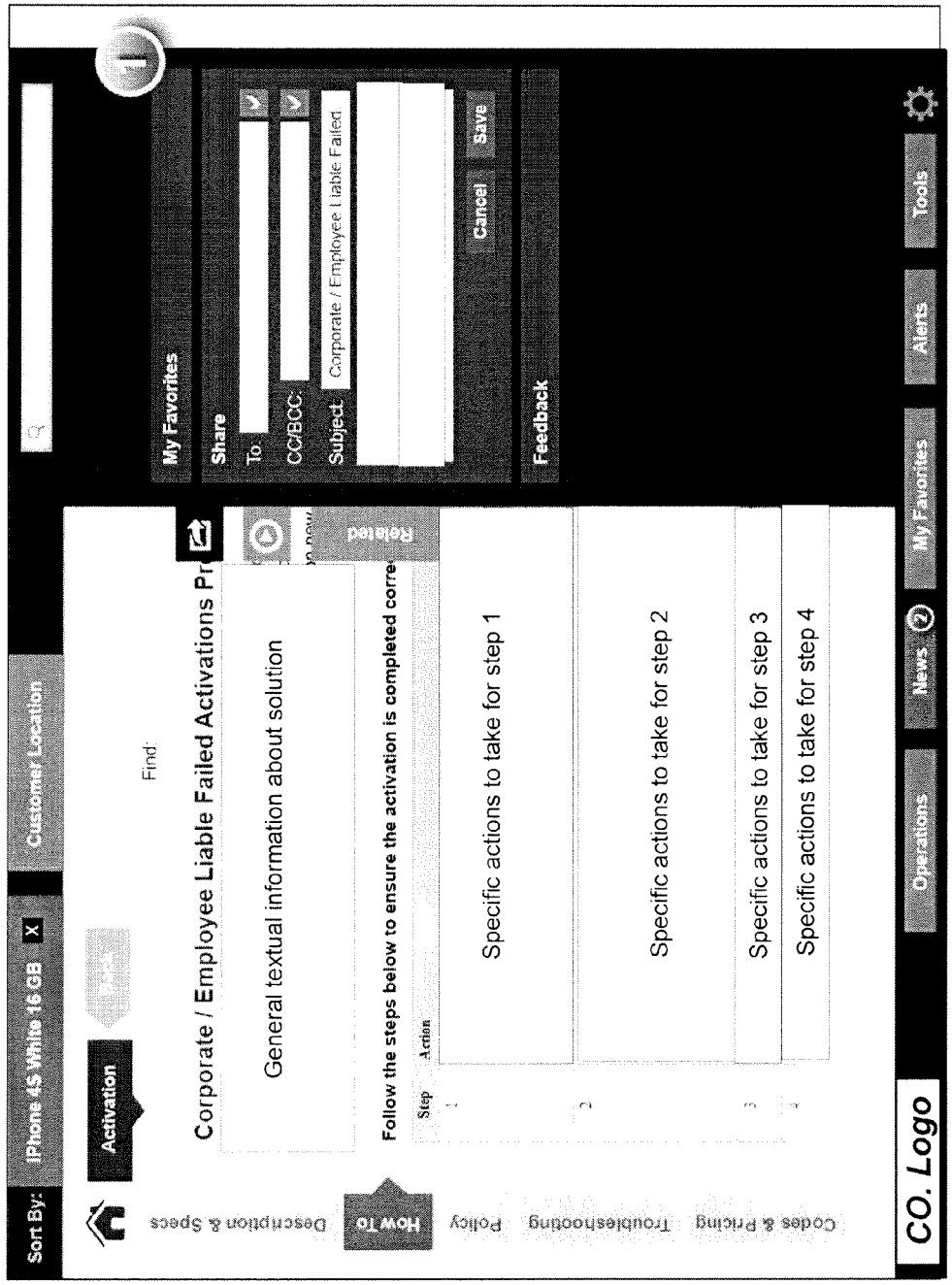

FIG. 8B shows this first type of side bar but in a mode in which the user has opted to share the current reference content page with another user, for example, via email. The share option via the action side bar allows the representative to enter the name of the contact to whom they want to send content. A dropdown for selection from a contact list may also be available to allow the user to select a previously entered destination from their personal contact list stored in the system. A directory of enterprise personnel may also be available, in which case, the representative may opt to click on a checkmark button or the like to look up a contact in the directory. Additional destinations may be selected for CC or BCC in a similar manner, if desired. In the example, the share instance of the action side bar offers the user boxes to enter a subject as well as text content, in a manner essentially similar to a typical email message. The example also allows the representative to cancel the email message by clicking a "Cancel" button which removes content entered in fields by the user and closes the sidebar. A save option may be available to save the message for later completion and/or transmission. A save option may be implemented as a default option in the event the user operates a button in a particular manner and/or closes the side bar before message transmission. When the representative has entered the relevant information in the exemplary fields for sharing via the email message, the user selects a send function (not yet visible in the example), and the communications device transmits the message as an email.

Figure 8C:
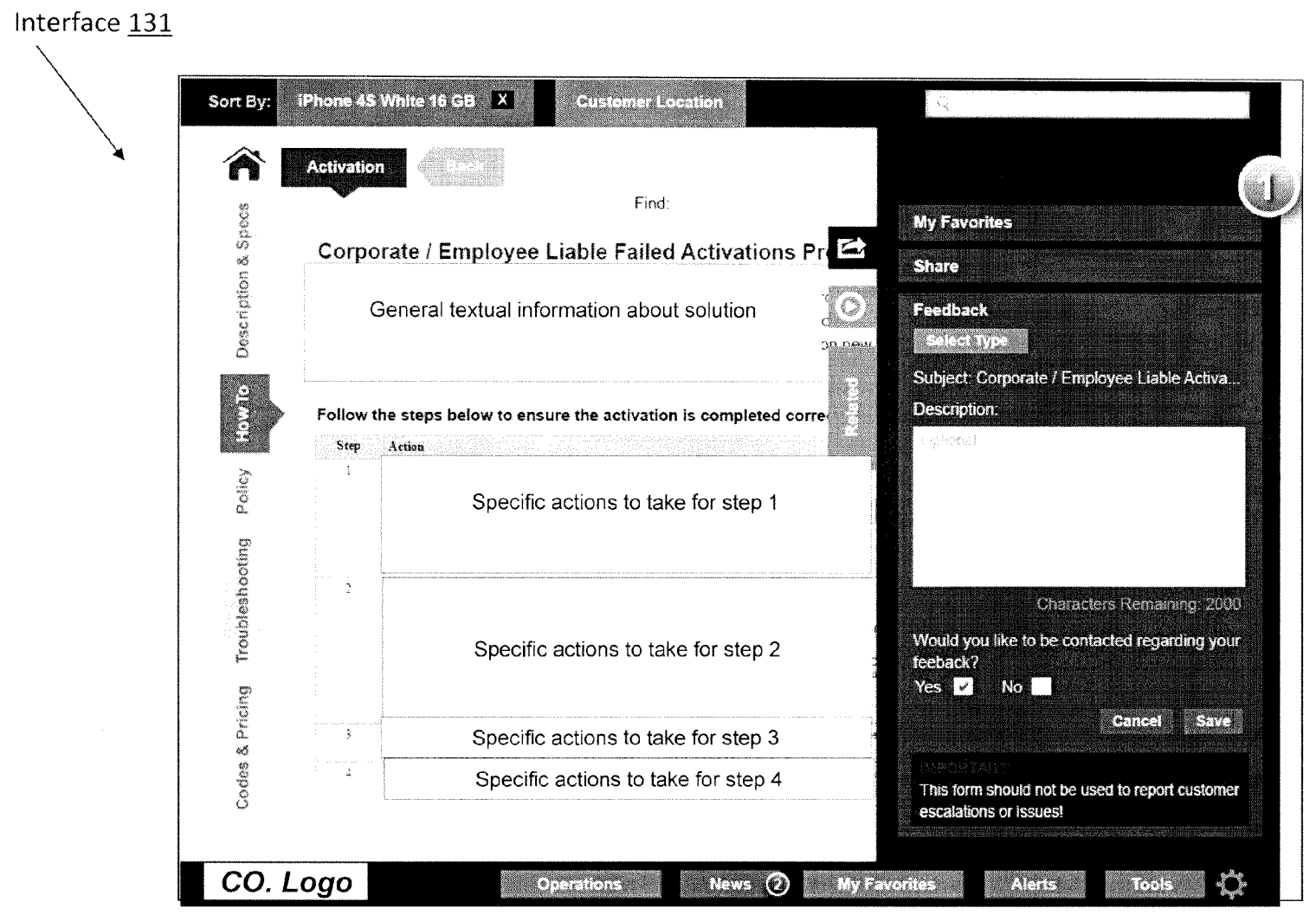

FIG. 8C shows this first type of side bar in a mode in which the user has opted to provide feedback to the system administrator with regard to the current reference content page. The feedback instance of the action side bar provides an input box and selection mechanisms to enable a representative that is using the communications device 120 to send feedback to the administrator. For example, the side bar may allow the user to select the type of feedback from a list of possible types, such as Select Type, Broken Link, Clarification, Content Missing, Content Wrong, Navigation—Where Do I Find?, Search, Suggestion, etc. Having selected a type of feedback, the communications device 120 allows the representative to enter a text description of the feedback, although the system may impose a limit on the number of characters of the text. In an example of this type of system feedback, the side bar may also offer an option for the representative to choose whether they want to be contacted regarding the feedback; although if offered, the default choice may be affirmative. A save option may be available to save the feedback message for later completion and/or transmission. The save option may be implemented as a default option in the event the user operates a button in a particular manner and/or closes the side bar before message transmission. Upon completion, feedback may be forwarded to the administrator in an appropriate/available manner, for example, as an email message to a specific administrator's mailbox or to a general mailbox for feedback.

Figure 8D:
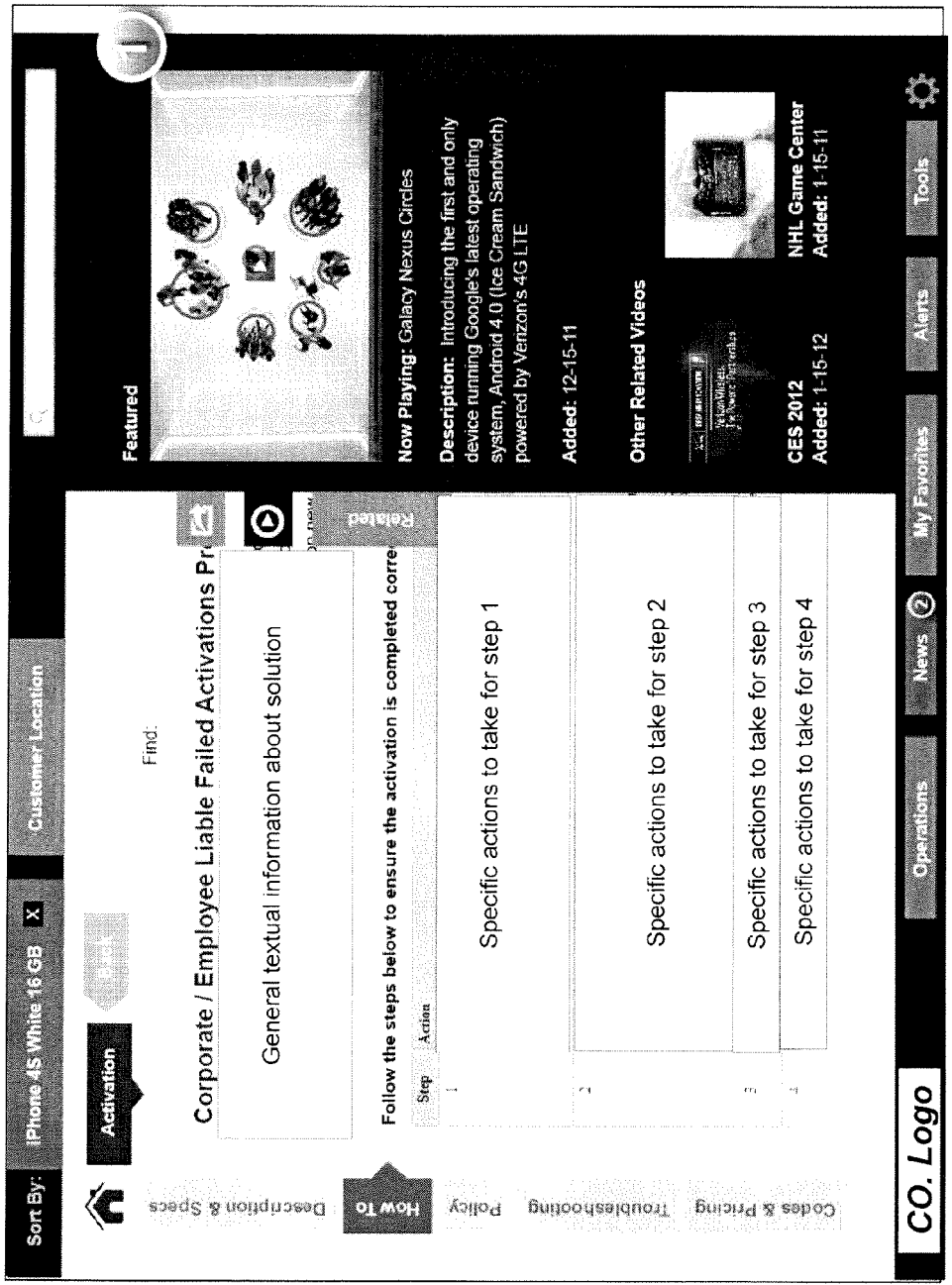

FIG. 8D is an example showing the side bar as it might appear if the user has selected the Video content icon 192. The video side bar displays a video as well as selectable links to other possibly relevant videos. The initially displayed video typically would relate to the information currently shown on the reference content page. Although not shown, the interface may also offer a selectable option to show the video in a full-screen mode.

Figure 8E:
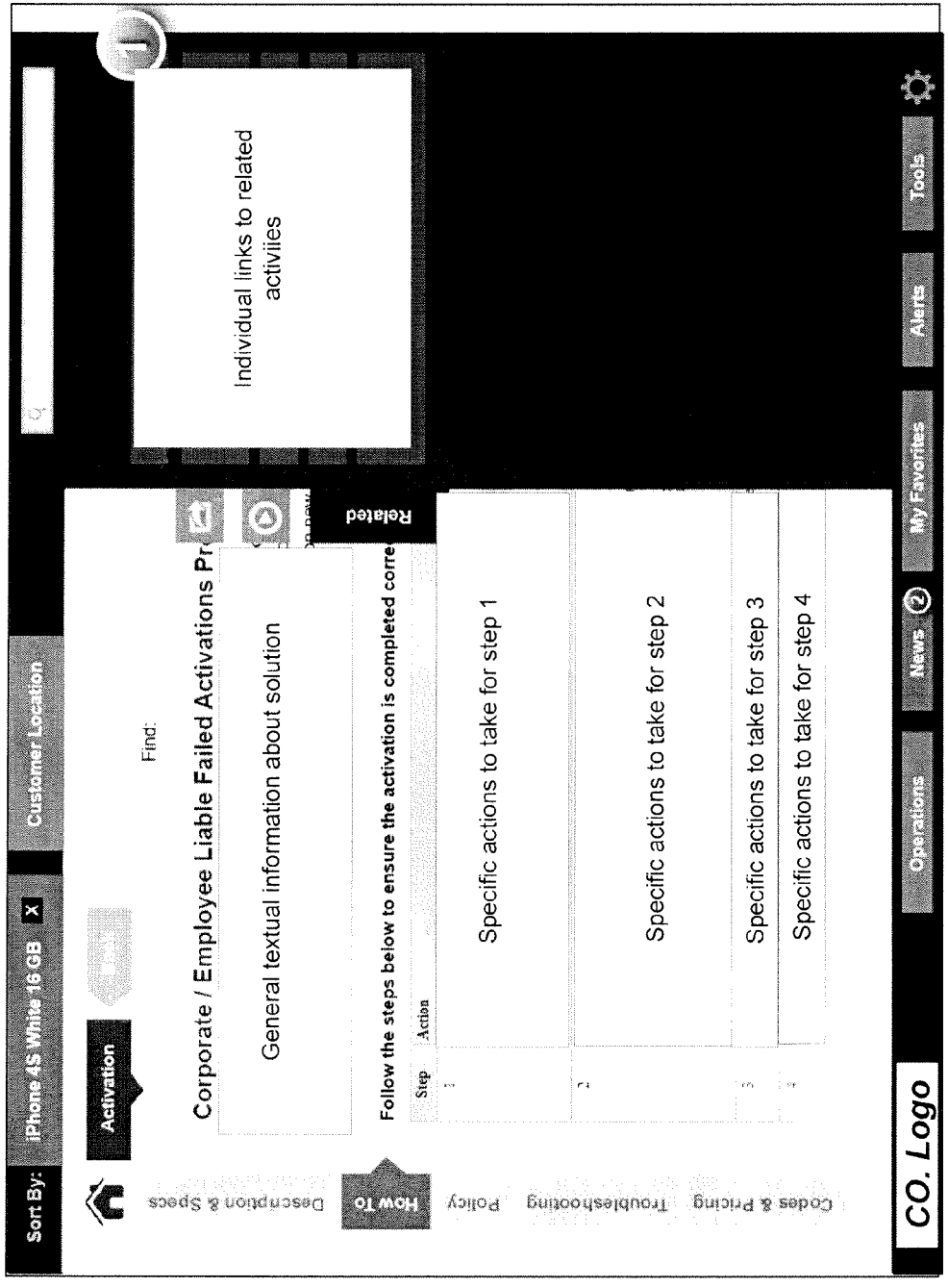

FIG. 8E is an example showing the side bar as it might appear if the user has selected the Related content icon 193.

As illustrated, the side bar provides links to content reference pages on topics that are related to the current reference content page.

The example regarding a reference content selection modal and a reference content page, as discussed above relative to FIGS. 6 to 8E may be applicable to navigation to modals and/or content pages for all of the panes 145 of the multi-dimensional grid. Our example focused on selection of the pane corresponding to selection of How To/Account. However, similar navigation information and further options may be provided upon user selection of panes corresponding to other row/column intersections in the grid. The exemplary wireless communications provider type implementation of the frontline representative assistance application interface 131 provides generally similar navigation and modal/page displays for content reached from selection of the panes corresponding to all rows under the Account, Billing and Activation columns. An example of that type of interface presents pages for the panes under the Device column in a somewhat different manner, as shown by way of examples in FIGS. 9A to 9D.

The user selects panes under the device tab in the same manner as described above relative to FIGS. 5A and 5B. FIGS. 9A to 9D show examples of pages that may be displayed in response to user selection of the Description & Specs, Policy, Troubleshooting and Codes & Pricing rows in the Device column of the interactive multi-dimensional grid.

As a general matter, the pages displayed in response to user selection of a pane 145 under the content tab 140 for Device will cause the communications device 120 to navigate to a page generally similar to the reference content page of FIG. 7, but with some differences as shown in the in FIGS. 9A to 9D. A device column content page like one of those shown in these later drawings provides information filtered based on the currently selected device and corresponding to the selected row of the grid. If a device has not been selected in the assistance application, the communications device 120 navigates to the device selection page, where the user can select a device. Upon selection, the assistant content corresponding to the device column and displayed on the associated reference pages is filtered based on the selected device. In the examples of FIGS. 9A to 9D, a device related page offers detailed information and/or links to pages with additional related information, on the device column topic selected to this point in the user's navigation through the interface 131.

On each of these device-related pages, the interface 131 presents a thumbnail of the selected device. The thumbnail may be a selectable icon that serves as a link, selection of which causes the communications device 120 to navigate to and open a modal providing different views of the selected device. For example, such an image modal may have one large image area and smaller image thumbnail reference buttons across the bottom, so the user can select their views. The representative using the communications device 120 may also be able to swipe or arrow-click on tablets or have a clickable arrow on a computer to side-swipe views. As another example, the image modal may offer a dynamically rotatable 3D simulated view of the device, which the user can rotate by swiping across the image.

When a device page is displayed, the screen and priority tabs 170 and 180 are visible and may be selectable from the display of the particular device reference content page. Selection of a priority tab 180, for example, may enable a device or location change and cause the filtering of reference content to change and thus change the information presented on the page. Selection of a screen tab 170 would cause navigation away from the device page, in a manner similar to navigation responsive to selection of such tabs described earlier.

The property tabs 150 along the left side of the grid are visible, and several of those tabs are selectable when the interface is displaying the reference content page about a device. The tab corresponding to the presently displayed content is shown in a different color and is not selectable. Selection of any of the other tabs 150 enables further navigation. In this way, the representative using the communications device 120 is able to navigate to other sections of the content under the currently selected device tab 140. In the examples of device pages (FIGS. 9A to 9D), only the one of the content tabs 140 (Device) that corresponds to the presently displayed content is shown, and that tab is not selectable. In this example, a back button is shown beside the one Device type content tab 140. Selection of the back button allows the user to navigate home, e.g. back to the multi-dimensional grid home page (e.g. FIG. 5A or FIG. 5B).

In these device page examples, the right column of each page, e.g., under the device thumbnail, shows several buttons. In the examples, the buttons are an Accessories button 195, a Training button 196, and a Launch Info button 197. The buttons represent clickable links on the device pages offered by the assistance interface 131.

Although not shown, selection of the Accessories button 195 may cause the communications device to navigate to a modal or reference page showing one or more available accessories related to the device selected. Alternatively, a list of accessories may be displayed in the content section across the available length, independent of space in left and right columns of the currently displayed device page.

Selection of the Training button 196 may cause the communications device to navigate so as to display corresponding training content, for example, in a modal or as a reference detail page. Similarly, selection of the Launch Info button 197 may cause the communications device to navigate to open a modal with information about the launch of the device.

A device page like any of those shown in the examples may also include the manufacture's name as a selectable link, e.g. under the device thumbnail. Selection of the device manufacturer link may cause the communication device 120 to navigate to the particular manufacturer's website, for example, to allow a representative to search that site for more information on a particular point of interest to a client.

The portion or column of either of these pages showing the relevant information may be scrollable, in any convenient manner, like several sections of earlier described pages.

Figure 9A:
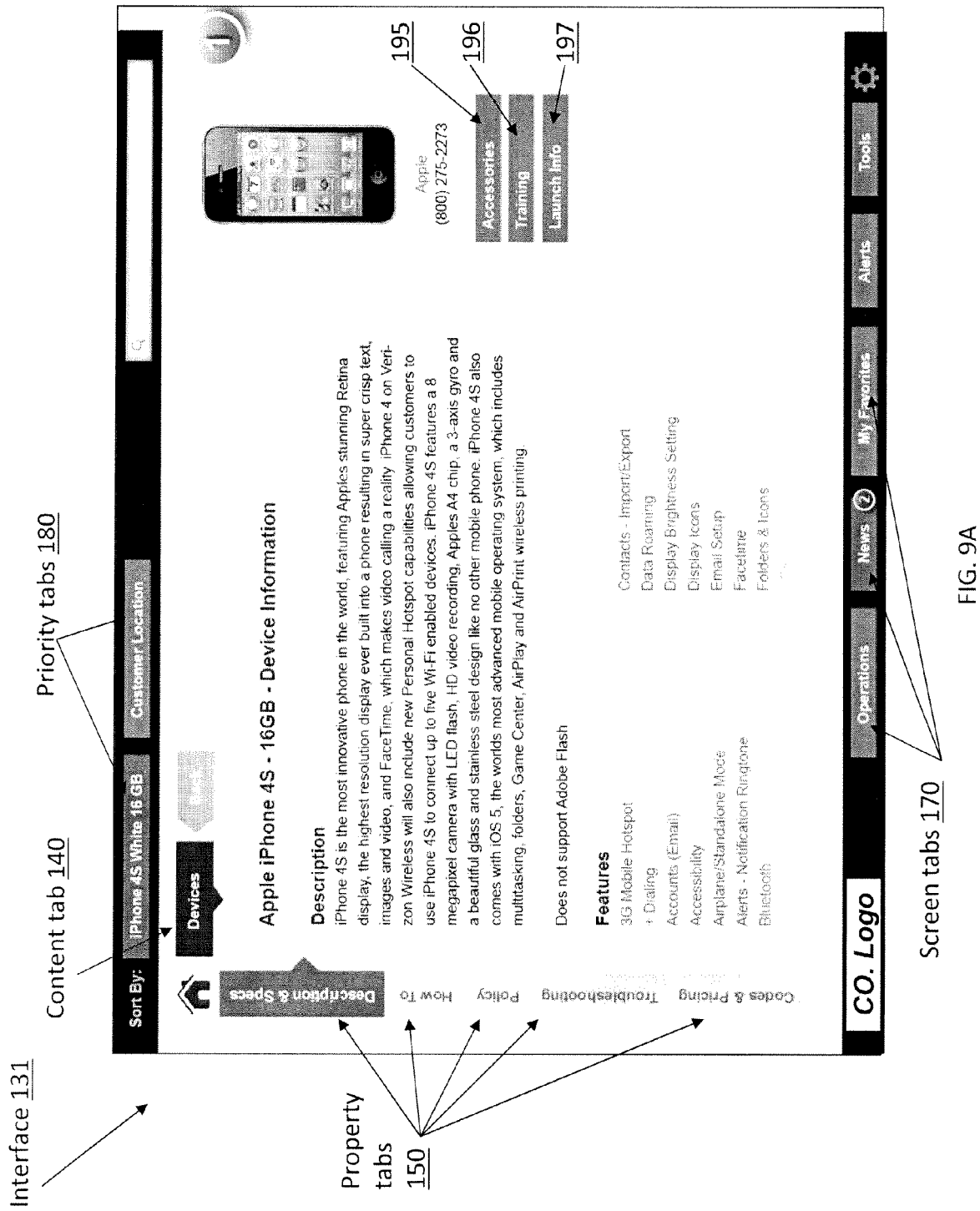
Figure 9B:
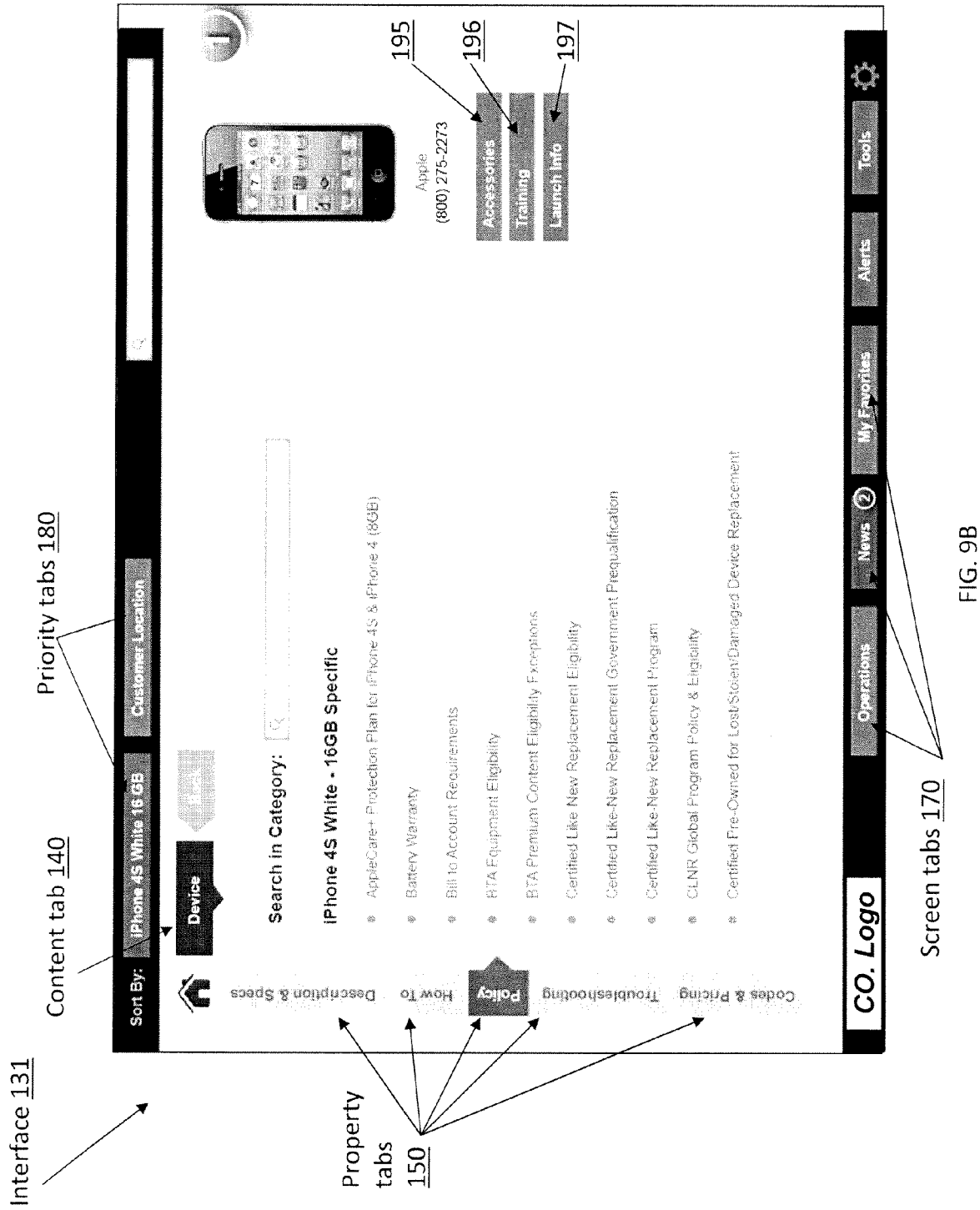
Figure 9C:
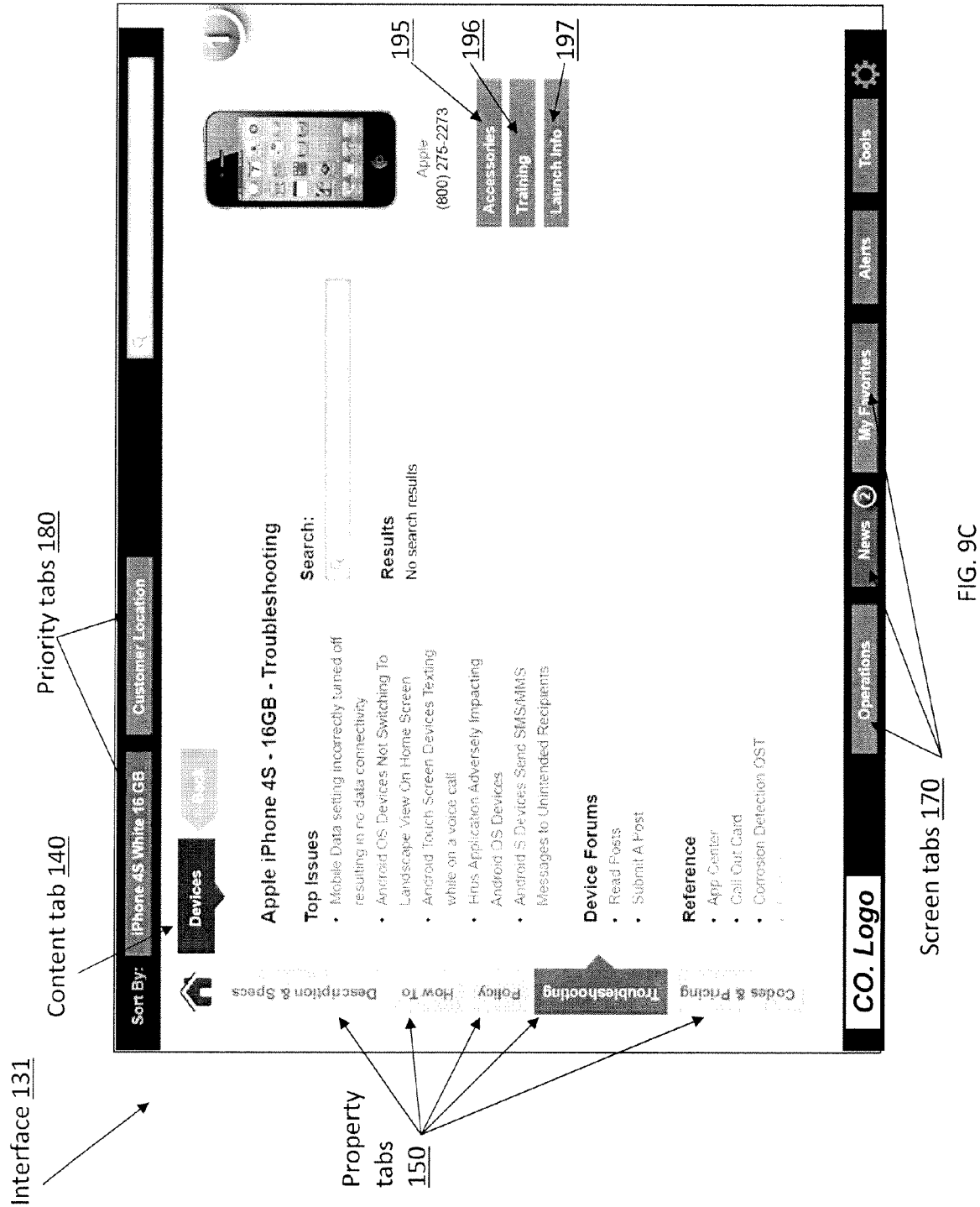
Figure 9D:
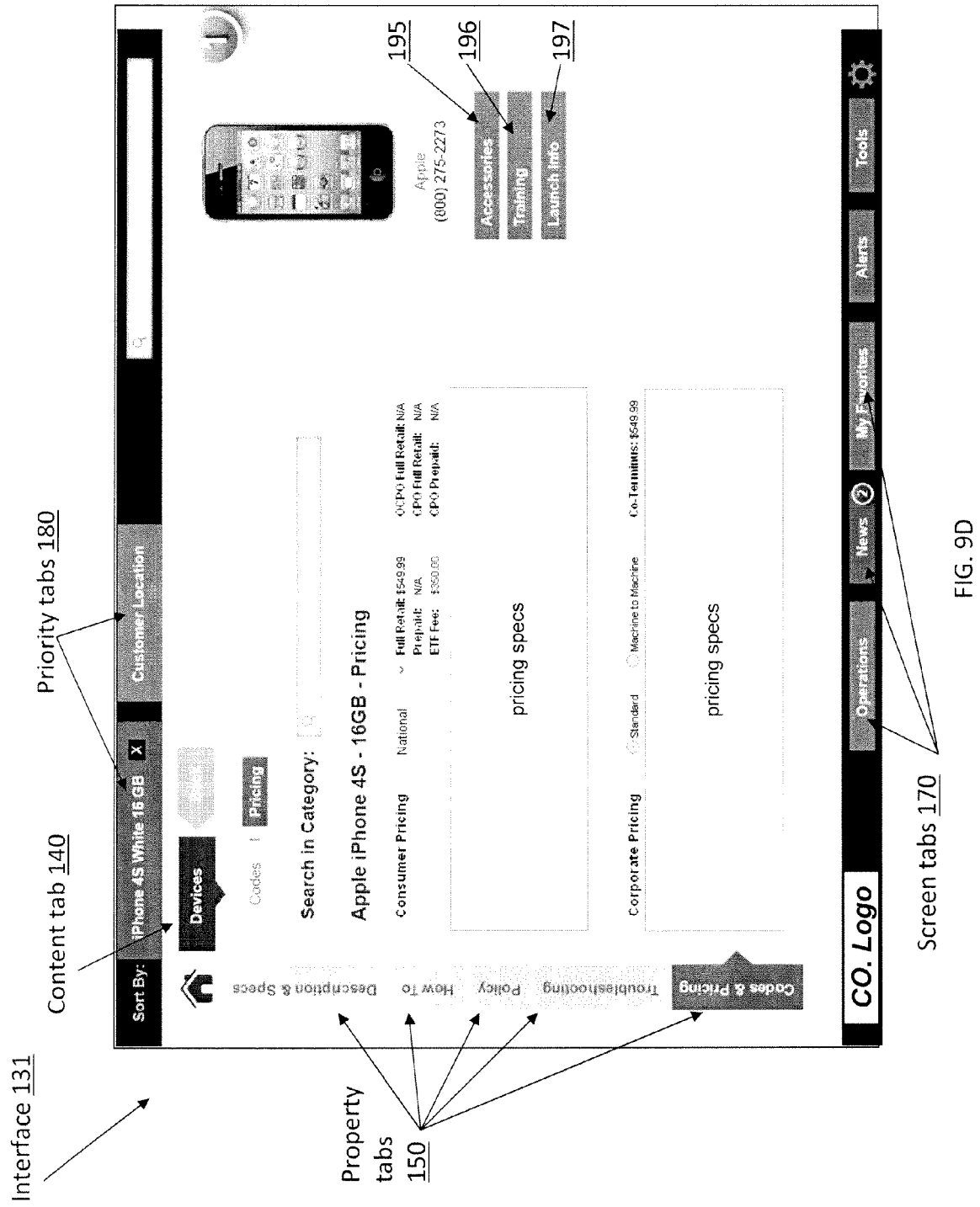

FIG. 9A shows an example of a page that the device 120 might display for a particular device, if a representative selects the pane 145 for device and descriptions & specs. Such a content page shows descriptive information about the device as well as links to other relevant information about features of the device. Selection of any of the linked features from such an exemplary page causes the communications device 120 to open the relevant page about the selected feature within the interface 131 of the assistance application (e.g. not in a new window or browser).

The How To page (not shown) and the Policy page (FIG. 9B) in our example would display device-specific and general content on the respective topic, for the currently selected device. The representative also is offered the option to search within the category, and the assistance application will return results in a search landing page.

The Troubleshooting page (FIG. 9C) in our example allows a representative to view the current top five issues with regard to the currently selected device. The text describing each issue may be a selectable link for navigation to a page providing information to address the particular issue. The exemplary Troubleshooting page also includes a Forum and Reference sections. The page content in the column showing the issue, forums and reference may be scrollable in any convenient manner as described earlier with regard to other pages. The Forum section allows the user to navigate to the landing page of a specific device to read or submit posts about the device. In the Reference section, the page displays links to reference content about the device, which is controlled by a system administrator. The representative also is offered the option to search for issues within the troubleshooting category, and the assistance application will return results, e.g. under the search box in the right column in the illustrated page example.

The exemplary Codes & Pricing page (FIG. 9D) allows the user to view Codes and Pricing content. In the example, the center content of the page offers a toggle interface with Codes as one tab and Pricing as the other (shown under the Back button). The currently selected tab may be highlighted on the display.

This page also offers a box for a content search option; which if used, will navigate to a search results landing page.

As outlined earlier, the frontline representative assistance application interface 131 includes a number of screen tabs 170 that enable the frontline representative 125 to launch other software or applications for use in serving the clients or tending to the matters pending at the work site. In the illustrated examples, these tabs are presented along the bottom of the display, and the exemplary tabs 170 include tabs for Operations, News, Favorites, Alerts, Tools and Settings. The Operations, News, Favorites, Alerts and Tools tabs appear as rectangular tabs with corresponding text labels; whereas the Settings tab takes the form of an icon shown as a gear wheel. Many of the displays discussed to this point include such tabs, in a format that allows the user to select from among the tabs 170.

The applications and/or pages that the device 120 and interface 131 present in response to selection of any of the screen tabs 170 may take many different forms corresponding to the respective topics identified by those tabs. Just a few examples are shown in drawing FIGS. 10 to 12B. In the displays presented in response to selection of screen tabs 170, the priority tabs 180 are still visible and active; and the screen tabs 170 are visible. The currently selected one of the screen tabs 170 is highlighted, e.g. in a different color; and the others of the tabs 170 are selectable for further navigation.

Figure 10:
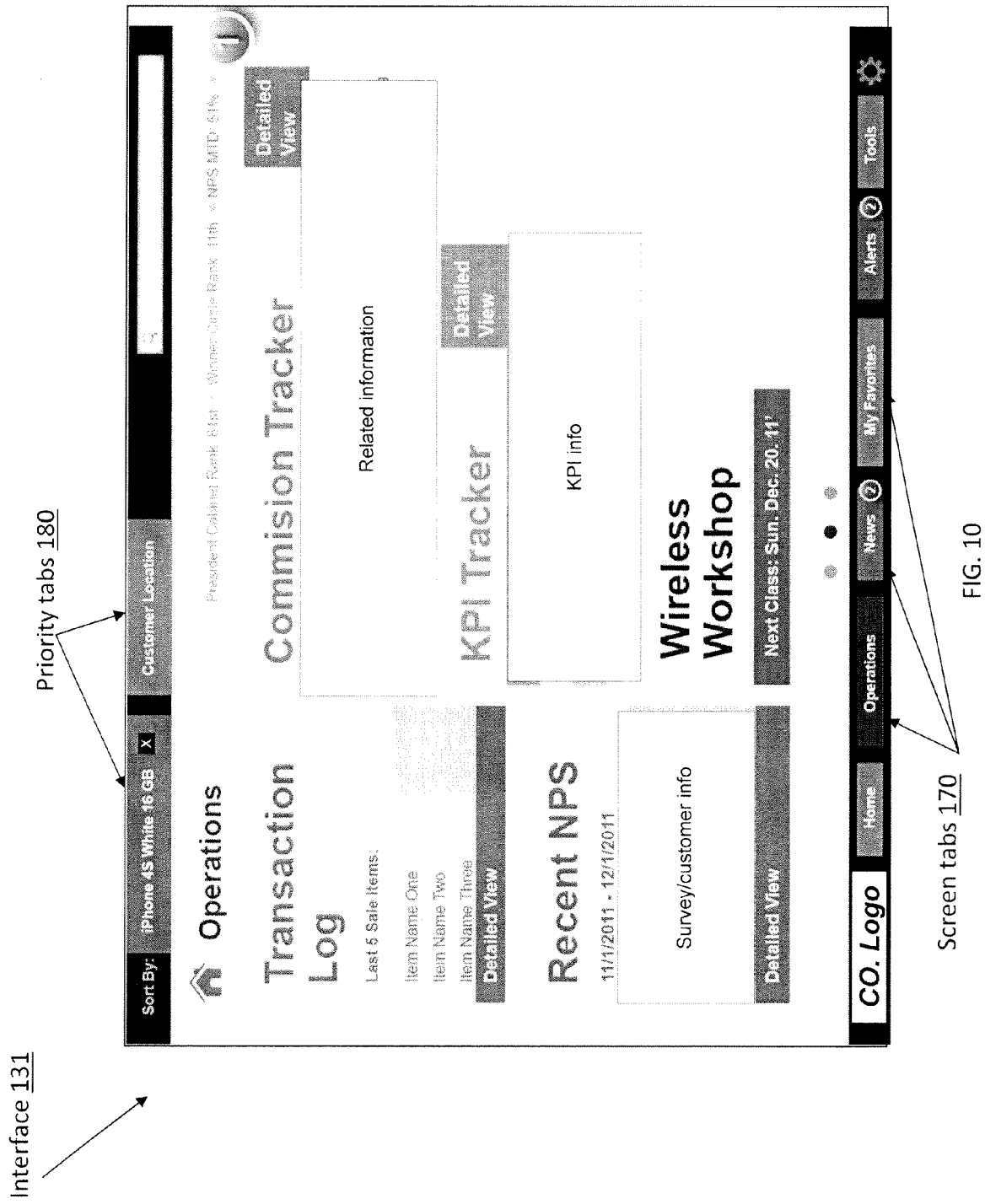

FIG. 10 represents an example of an Operations page displayed in response to a user selection of the Operations tab from among the screen tabs 170, as might be presented in response to a user selection of the Operations tab among screen tabs 170 in one of the earlier display examples. The exemplary Operations page offers a dashboard of shortcuts and actionable items to help the frontline representative manage their day. Exemplary sections include a KPI Tracker section, a Commission Tracker, a Transaction log section, a Recent NPS section and a Wireless Workshop section. Information or lists of links under each section may be scrollable in any convenient manner. The KPI section shows tracking information about personal and store status. The Commission Tracker section allows the representative to enter data about commissions earned and to track earned commissions. The Transaction Log section tracks activities of the representative, for example, as the point of sale in the storefront.

The exemplary frontline representative assistance interface 131 also offers news information accessible from many of the exemplary displays by user selection of the News tab from among the screen tabs 170. FIGS. 11A to 11D show examples of several types of news related screens that may be presented via the frontline representative assistance interface 131 on the communications device 120. As in the Operations example, priority tabs 180 are shown and may be active, the screen tabs 170 are shown, and the screen tabs 170 other than the News tab are selectable. The News tab may be highlighted.

Figure 11A:
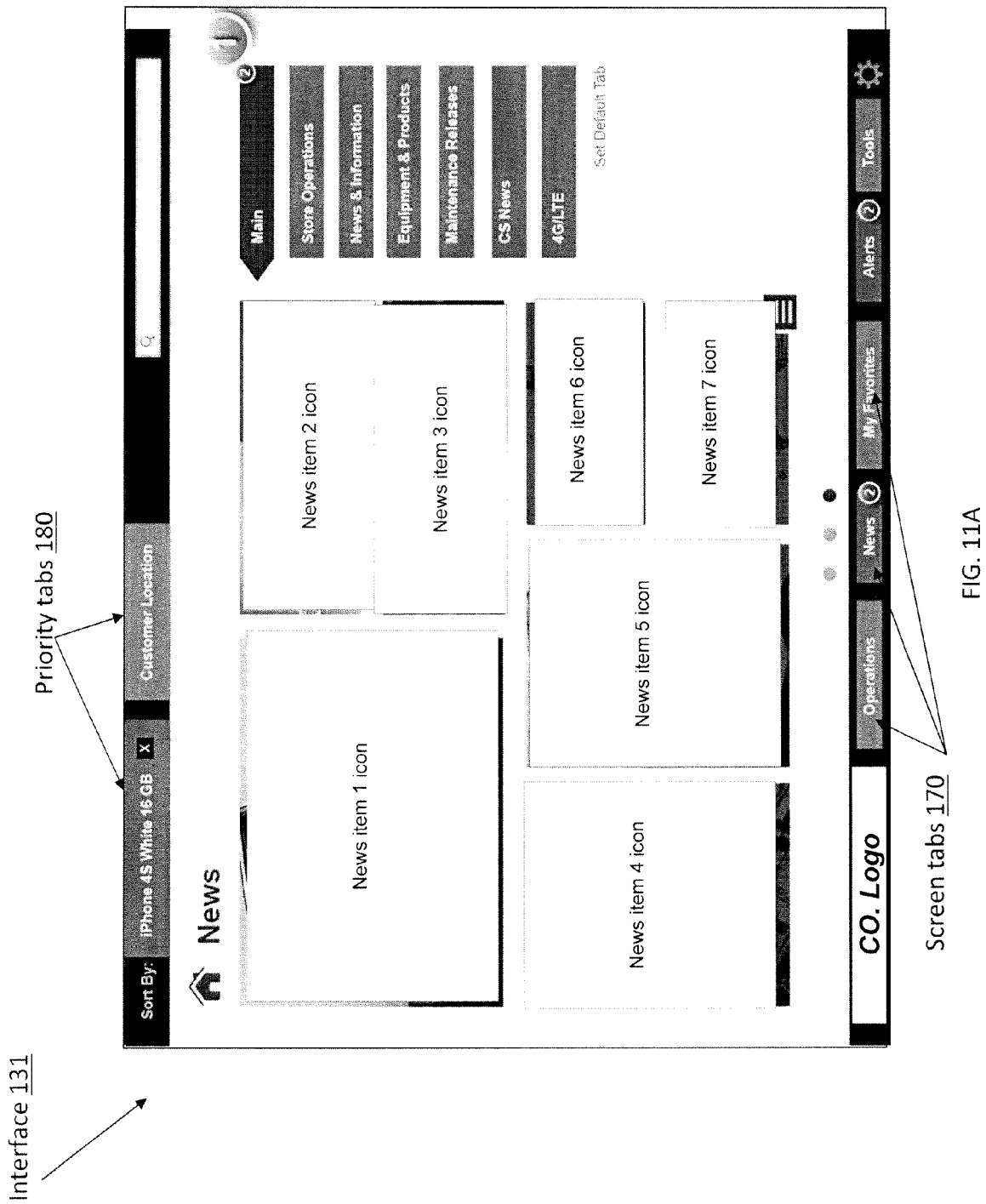
Figure 11B:
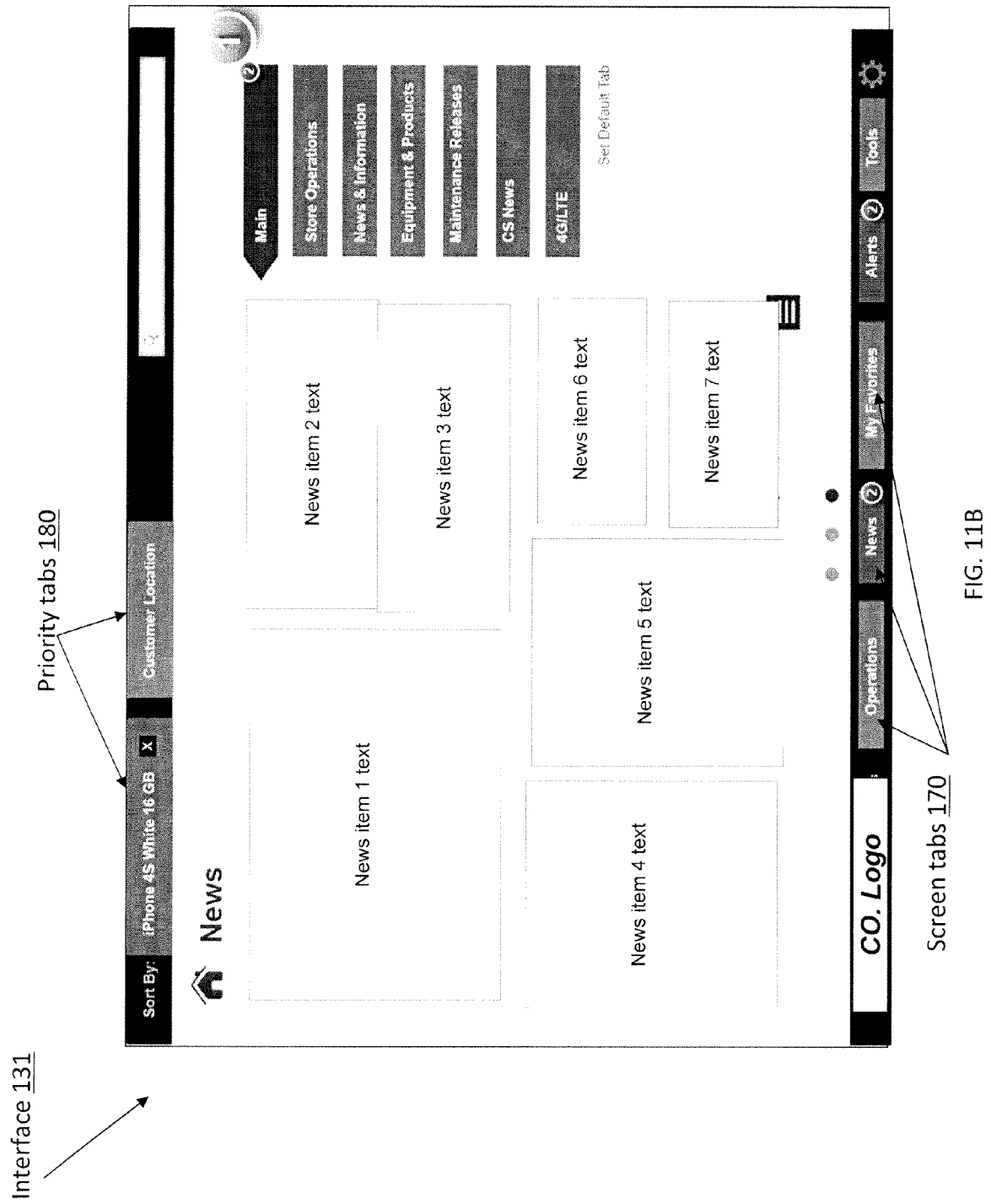
Figure 11C:
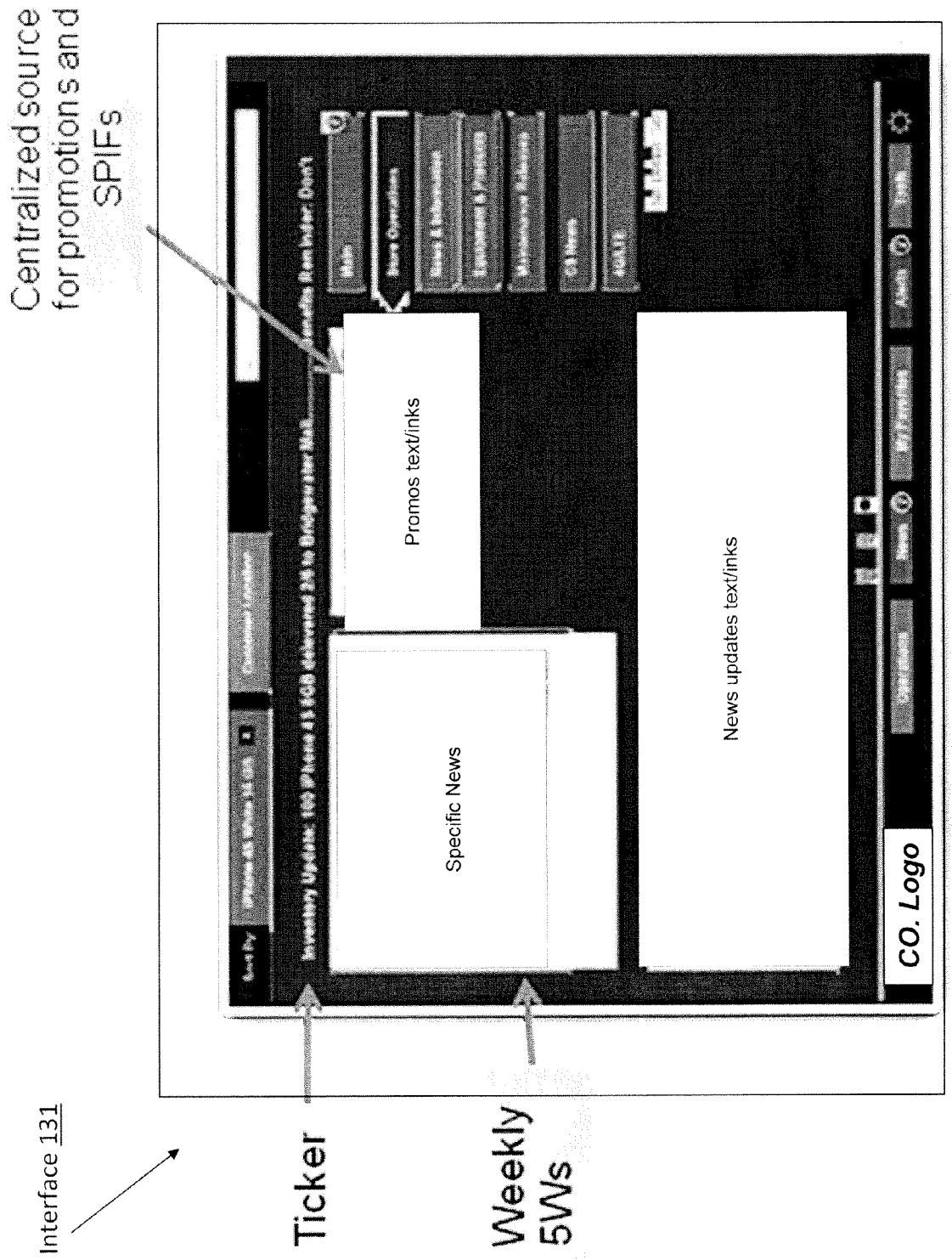
Figure 11D:
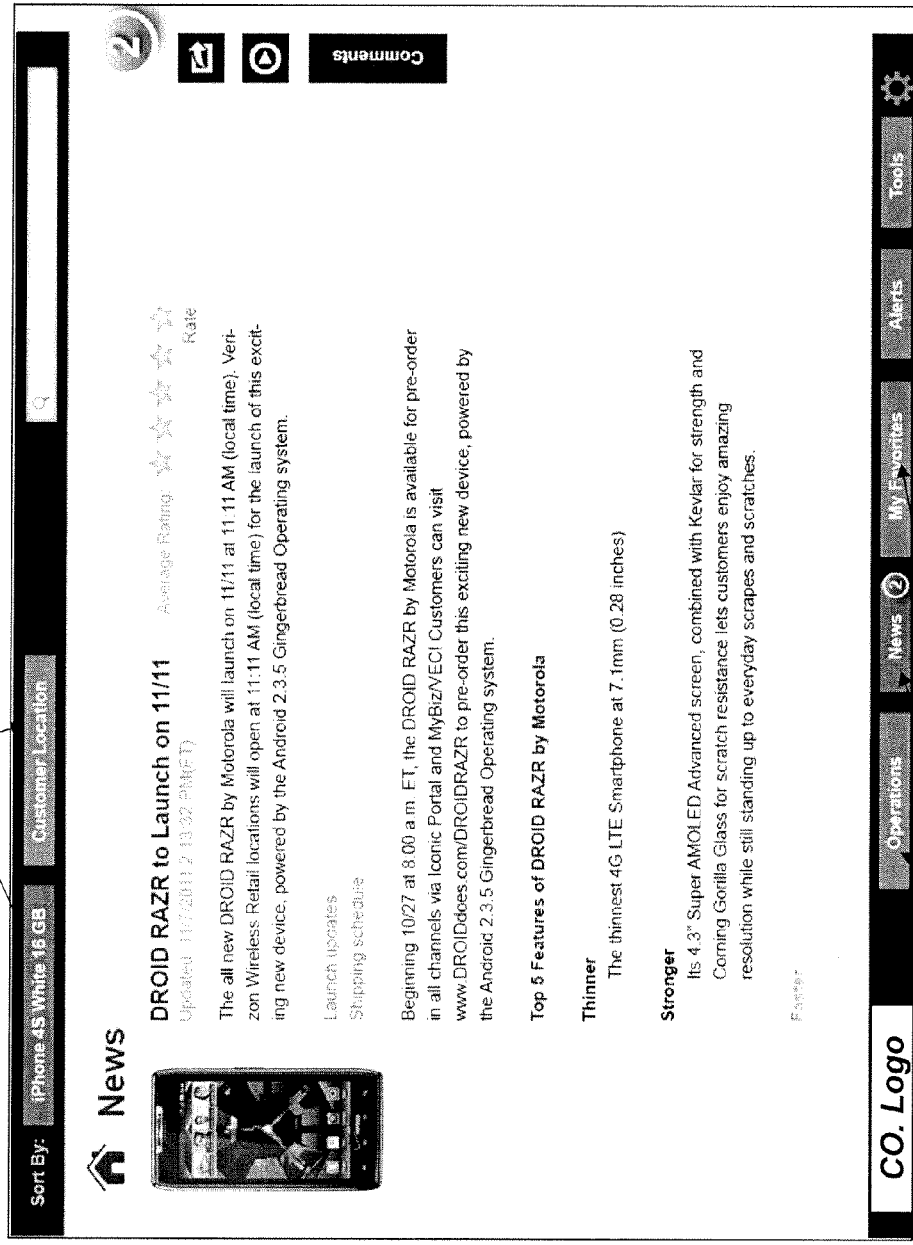

The News function of the interface 131 allows a representative to view news articles with larger images and headlines. The interface may also allow the user to see their operation and area news. FIG. 11A is an example of an image view, whereas FIG. 11B is an example of a text view. With such an implementation, the view can be switched from an image view to a text view, to give the user a quick read of articles. The news page(s) may also provide a ticker, e.g., to display operations-related alerts or news items. FIG. 11C is an example of an operations news view. FIG. 11D is an example of an article view, as may be presented following selection of an item displayed in an image view (e.g. FIG. 11A) or in a text view (e.g. FIG. 11B).

A store operations news page, such as shown in FIG. 11C, may include a ticker, to provide content such as inventory updates and HR reminders. The exemplary page also displays promotions that are to be showcased in the particular store. This page may also show any weekly updates and/or local news. The data on the store operations page may be managed through a centralized database so as to allow the various types of messages shown on the store operations page to be sent to specific representatives working in specific stores. The application can identify each representative by the employee's company identifier so as to personalize message when the user. The messages presented to a particular representative can be personalized with respect to geographical area, channel (e.g. sales versus support), store (exact store) etc. that the user belongs to. The record for an identified representative may indicate location, e.g. area and/or store, as well as the representative's channel of operation (e.g. sales versus support). The centralized database of the operations messages are similarly keyed to criteria such as area, store and channel. Based on the employee identifier, the application filters messages based on the user's record to determine the messages that need to be popped-up on the display screen for presentation to the particular representative when logged-in to the assistance application on the communications device 120.

A news article page like that shown in FIG. 11D allows the user to review the article content as well as to rate and comment on the content, thereby perhaps permitting the content in the article to be revised accordingly by an operator in charge of that article.

Sections shown in these news screens may be scrollable, if information for a particular section would require more display space than is available for the information.

The exemplary image, text, and operations news views also offer tabs along the right side for navigation to other topics. A representative may be able to set the default view for the right-column navigation. Once set, the navigation in that column will remain set for all return visits until the user changes or removes default.

In our example, the news article page instead offers additional navigation options in the form of an Action icon, (to Share, add to Favorites and/or provide feedback), a Video content icon, and a view Related content icon. These icons are similar to and provide navigation to side bars for additional user interaction similar to the icons and side bars discussed above relative to FIGS. 7 to 8E.

The exemplary frontline representative assistance application interface 131 also provides alerts for the representative using the communications device 120. Alerts may be presented in a variety of ways, and FIGS. 12A and 12B show a couple of examples of alert screens or pages that may be presented via the interface 131.

Figure 12A:
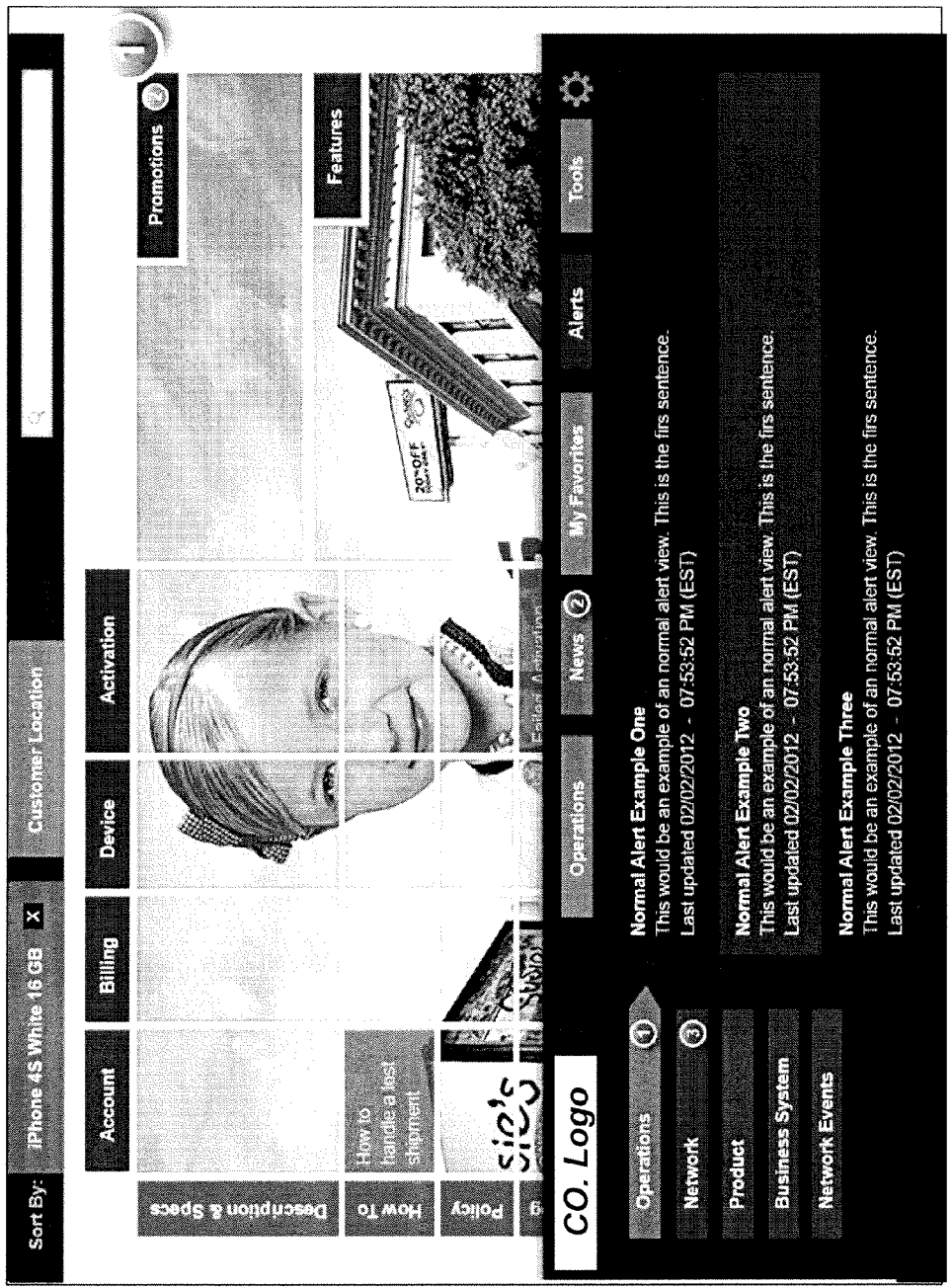

FIG. 12A is an example of an alerts view with information about received but unviewed alerts and navigation options shown as an overlay, in this case, over a view of the grid that would be otherwise similar to the view of FIG. 5A. The alerts view shows selectable buttons for several categories of alerts, in this example, for Operations, Network, Product, Business System and Network Events. The alerts page in our example shows alerts content for a selected one of the categories (distinguished by an arrow configuration of the respective button). The page also shows a number on or near each respective button indicating the number of new alerts available for the respective category.

Figure 12B:
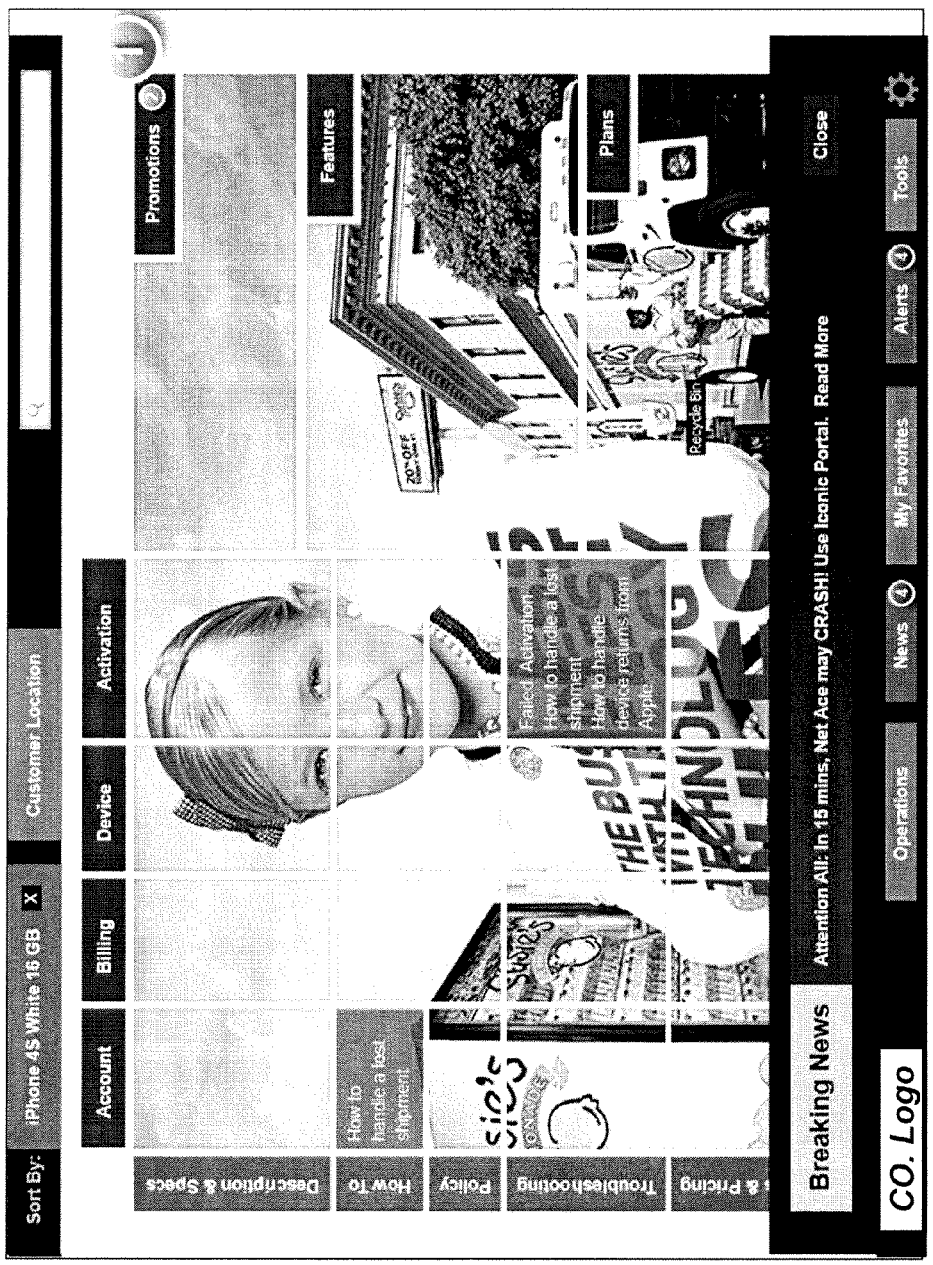

FIG. 12B is an example of a breaking news display, with a headline shown in a bar near or across the bottom of a view of the grid that would be otherwise similar to the view of FIG. 5A.

Figure 13:
Figure 14:
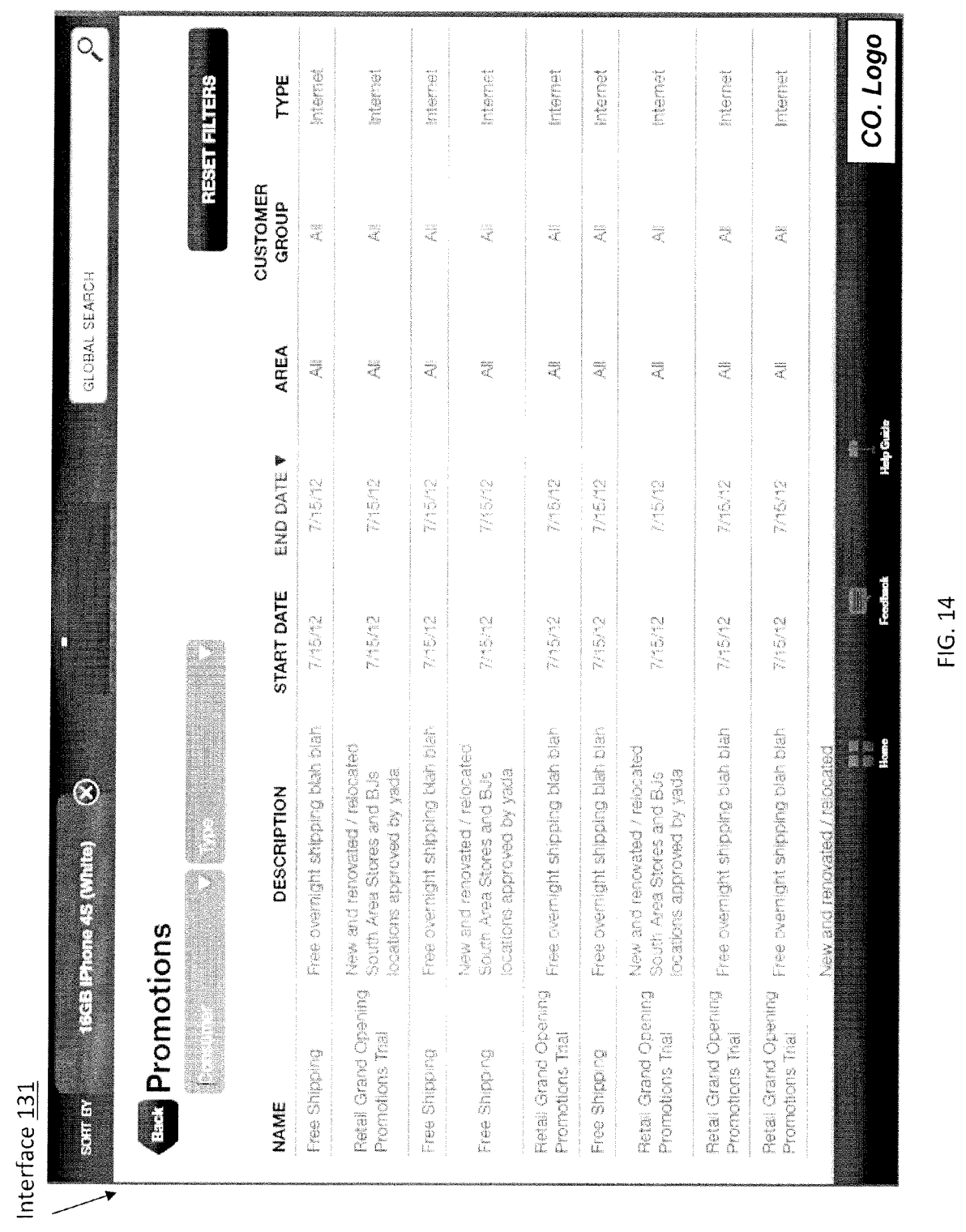
Figure 15:
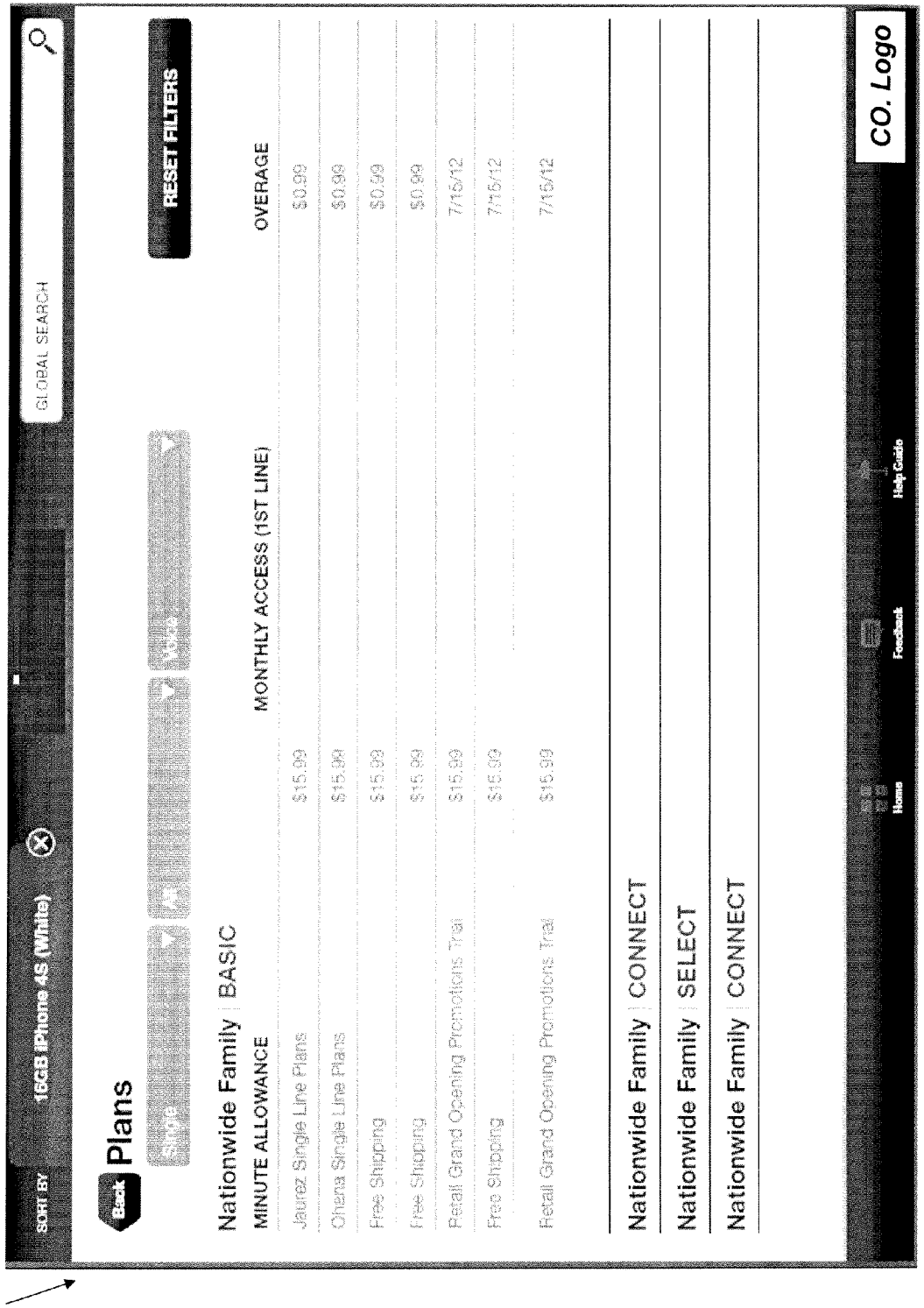

As noted earlier, the multi-dimensional grid may include a number of fields that represent additional topics regarding which the frontline representative 125 may be interested in obtaining information, which are accessed by selection of feature tabs 160. The examples of the interactive multi-dimensional grid shown in FIGS. 5A and 5B include features tabs 160, for the topics "Promotions," "Features" and "Plans." As shown in FIG. 5B, some relevant information on each topic may be shown in the respective associated pane. The information in these grid panes may be ranked with regard to actual or expected most frequently requested information under these additional topics in a manner similar to the information presented in the other panes as discussed earlier. Whether information is shown in the pane or not, selection of (e.g. taping or clicking on) any of the tabs 160 causes the assistance application to navigate to a page or the like with associated additional information on the topic of the selected tab 160. FIGS. 13 to 15 show examples of additional information pages as might be presented in response to such user selection of the Promotions," "Features" and "Plans" tabs respectively, filtered by the current device selection. These pages may include active links to additional information and/or a search box, to enable the user to access additional assistance information, in a manner described earlier with regard to any of the other pages offered via the assistance interface 131. Although not shown, additional input and/or navigation options may also be included on any of these pages similar to options provided on earlier discussed pages.

As shown by the discussion above and the examples illustrated in the drawings, the assistance application software 267 configures the communications device 120 to present a user interface 131 that is effective for accessing client assistance information of an enterprise. The interface 131 includes an interactive grid presented on a display 130 of the communications device 120. The grid display includes selectable panes, content tabs 140 displayed in position in a first dimension of the grid display, and property tabs 150 displayed in position in a second dimension of the grid display. The content tabs 140 identify primary categories of subject matter of a database of assistance information accessible via the interface 131. The property tabs 150 identify sub-categories of the subject matter of the database categories identified by the primary content tabs 140. Available assistance information is sorted and selected via the interactive grid based on the primary categories and the sub-categories. Information is displayed in at least a respective one of the selectable panes at a grid location corresponding to one of the content tabs and to one of the property tabs related to frequently requested assistance information from the database category identified by the one property tab and corresponding to the one sub-category identified by the one property tab. In response to a user selection of a pane 145 at a point on the grid for the category and sub-category that best matches the information desired by the representative, the device interface drills down to obtain and display more specific information based on the appropriate combination of primary and secondary categories.

The interface 131 may also provide one or more other types of tabs, for causing the communication device 120 to navigate and provide other information or functionalities via the interface 131. In several of the examples, the user interface 131 further displays priority tabs 180. The information presented in the pane(s) 145 of the grid is filtered based on a user selection corresponding to one of the priority tabs 180. Also, the more detailed information presented upon user selection of a pane 145 from the grid is filtered based on the user selection corresponding to the one of the priority tabs 180.

As another example, the user interface 131 may further include feature tabs 160 identifying additional categories of subject matter of the database. In such an implementation, the grid would further include a pane corresponding to each respective one of the feature tabs for selective display of information from the category corresponding to the respective feature tab.

As another example of additional tabs, the user interface 131 may further include screen tabs 170 for identifying additional assistance services available through the interface on the communications device. The interface 131 offers a further presentation for output via the display regarding an additional service corresponding to each of the screen tabs 170.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   at a communications device at a work site of an enterprise, obtaining frequently requested information pertaining to products or services offered by the enterprise, from a database that stores the information; and
   providing the frequently requested information to a user of the communications device via an interactive multi-dimensional grid display of the communications device, the interactive multi-dimensional grid display including a plurality of panes arranged in columns and rows in multiple dimensions to form the grid display, a selectable pane among the plurality of panes, content tabs, and property tabs, wherein:
   the content tabs are positioned in a first of the multiple dimensions of the grid display, and a respective row or column of the plurality of panes extends from each of the content tabs in a second of the multiple dimensions of the grid display, the content tabs identifying primary category topics relating to the products or services,
   the property tabs are positioned in the second of the multiple dimensions of the grid display, and a respective column or row of the plurality of panes extends from each of the property tabs in the first of the multiple dimensions of the grid display, the property tabs identifying sub-category topics relating to the products or services,
   the frequently requested information is provided to the user in the selectable pane at a location on the multi-dimensional grid display at a row and column intersection corresponding to one of the content tabs and one of the property tabs, and
   the frequently requested information includes information relating to the products or services offered at the work site of the enterprise and identified by the category topic of the one content tab and the sub-category topic of the one property tab corresponding to the row and column intersection.

2. The method of claim 1, wherein the content tabs are located along a first side in the first dimension of the interactive multi-dimensional grid display, and the property tabs are located on a second side and in the second dimension of the interactive multi-dimensional grid display.

3. The method of claim 1, further including providing the frequently requested information to the user of the communications device in response to receiving, from the user, a selection of the selectable pane of the interactive multi-dimensional grid display, the selected selectable pane belonging to and including frequently requested information relating to one of the primary category topics and one of the secondary category topics.

4. The method of claim 1, further including updating the frequently requested information in response to updates made to the database.

5. The method of claim 4, further including notifying the user of the communications device of the updates made to the database.

6. The method of claim 1, further including receiving information relating to promotions pertaining to the products or services offered at the work from the database and presenting the promotions, to the user of the communications device, in the interactive multi-dimensional grid display.

7. The method of claim 1, wherein providing the user of the communications device with direct access to the frequently requested information includes providing access to the information without requiring the user to search the database.

8. A computer program product comprising a non-transitory computer readable medium having computer readable code stored thereon, which, when executed by a processor of a communications device, configures the communications device to:
   obtain frequently requested information pertaining to products or services offered by an enterprise from a database that stores the information; and
   provide the frequently requested information to a user of the communications device in an interactive multi-dimensional grid display, the interactive multi-dimensional grid display including a plurality of panes arranged in rows and columns in multiple dimensions to form the grid display, a selectable pane among the plurality of panes, a content tabs, and property tabs, wherein:
   the content tabs are positioned in a first of the multiple dimensions of the grid display, and a respective row or column of the plurality of panes extends from each of the content tabs in a second of the multiple dimensions of the grid display, the content tabs identifying primary category topics relating to the products or services,
   the property tabs are positioned in the second of the multiple dimensions of the grid display, and a respective column or row of the plurality of panes extends from each of the property tabs in the first of the multiple dimensions of the grid display, the property tabs identifying sub-category topics relating to the products or services, and
   the frequently requested information is provided to the user in the selectable pane at a grid location at a row and column intersection corresponding to one of the content tabs and one of the property tabs, and
   the frequently requested information includes information relating to the products or services identified by the category topic of the one content tab and the sub-category topic of the one property tab corresponding to the row and column intersection.

9. The computer program product of claim 8, wherein execution of the computer readable code by the processor further configures the communications device to arrange the content tabs on a first side in the first dimension of the interactive multi-dimensional grid display, and arrange a the property tabs on a second side in the second dimension of the interactive multi-dimensional grid display.

10. The computer program product of claim 8, wherein execution of the computer readable code by the processor further configures the communications device to provide the frequently requested information to the user of the communications device in response to receiving, from the user, a selection of the selectable pane included in the interactive multi-dimensional grid display, the selected selectable pane belonging to and including frequently requested information relating to one of the primary category topics and one of the secondary category topics.

11. The computer program product of claim 8, wherein execution of the computer readable code by the processor further configures the communications device to access the database through a communications network that provides the communications device with network connectivity and obtain the frequently requested information from the database.

12. The computer program product of claim 8, wherein execution of the computer readable code by the processor further configures the communications device to update the frequently requested information in response to updates made to the database.

13. The computer program product of claim 12, wherein execution of the computer readable code by the processor further configures the communications device to notify the user of the communications device of the updates made to the database.

14. The computer program product of claim 8, wherein execution of the computer readable code by the processor further configures the communications device to receive information relating to promotions pertaining to the products or services offered at the work site from the database and present the promotions, to the user of the communications device, in the interactive multi-dimensional grid display.

15. The computer program product of claim 8, wherein execution of the computer readable code by the processor further configures the communications device to provide the user of the communications device with direct access to the frequently requested information by providing access to the information without requiring the user to search the database.

16. A communications device, comprising:
  a user input element;
  a display;
  a processor coupled to the at least one user input element and the display;
  a memory accessible by the processor; and
  an assistance application program stored in the memory, wherein execution of the assistance application by the processor configures the communications device to provide a user interface via the display and responsive to operation of the user input element, the user interface of the assistance application comprising:
    a grid display of selectable panes in columns and rows in two dimensions;
    content tabs displayed in position in a first of the dimensions of the grid display and identifying primary category topics relating to products or services of a database of assistance information accessible via the interface, a respective row or column of the selectable panes extending from each content tab in the second of the dimensions of the grid display;
    property tabs displayed in position in the second of the dimensions of the grid display and identifying sub-category topics related to the products or services, a respective column or row of the selectable panes extending from each property tab in the first of the dimensions of the grid display; and
    frequently requested information displayed in at least a respective one of the selectable panes at a grid location at a row and column intersection corresponding to one of the content tabs and to one of the property tabs, the frequently requested information including information relating to the products or services identified by the category topic of the one content tab and the sub-category topic of the one property tab corresponding to the row and column intersection.

17. The communications device of claim 16, wherein:
the user interface further comprises priority tabs,
the information presented in the at least one pane is filtered based on a user selection corresponding to one of the priority tabs, and
the more detailed information is filtered based on the user selection corresponding to the one of the priority tabs.

18. The communications device of claim 16, wherein:
the user interface further comprises feature tabs identifying additional category topics of subject matter of the database, and
the grid further comprises a pane corresponding to each respective one of the feature tabs for selective display of information from the additional category topic corresponding to the respective feature tab.

19. The communications device of claim 16, wherein:
the user interface further comprises screen tabs identifying additional assistance services available through the interface on the communications device, and
a presentation for output via the display regarding an additional service corresponding to each of the screen tabs.

20. The communications device of claim 16, wherein:
the user interface further comprises a screen display of additional more detailed information presented on the screen display in response to user input of a selection of the respective pane from the grid display, and
the more detailed information comprises further information from the category topic identified by the one content tab and corresponding to the one sub-category topic identified by the one property tab.

\* \* \* \* \*